(12) United States Patent
Ceder et al.

(10) Patent No.: US 10,431,822 B2
(45) Date of Patent: Oct. 1, 2019

(54) BATTERY MATERIALS INCLUDING P2-TYPE LAYERED MATERIALS FOR ELECTROCHEMICAL DEVICES

(71) Applicant: Massachusetts Institute of Technology, Cambridge, MA (US)

(72) Inventors: Gerbrand Ceder, Orinda, CA (US); Lei Liu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 32 days.

(21) Appl. No.: 15/582,348

(22) Filed: Apr. 28, 2017

(65) Prior Publication Data

US 2017/0317350 A1    Nov. 2, 2017

Related U.S. Application Data

(60) Provisional application No. 62/328,659, filed on Apr. 28, 2016.

(51) Int. Cl.

| | | |
|---|---|---|
| *H01M 4/525* | (2010.01) | |
| *C01G 51/00* | (2006.01) | |
| *H01M 4/505* | (2010.01) | |
| *H01M 10/054* | (2010.01) | |
| *H01M 4/04* | (2006.01) | |

(52) U.S. Cl.
CPC ............ *H01M 4/525* (2013.01); *C01G 51/50* (2013.01); *H01M 4/0445* (2013.01); *H01M 4/505* (2013.01); *H01M 10/054* (2013.01); *C01P 2002/50* (2013.01); *C01P 2002/72* (2013.01); *C01P 2002/76* (2013.01); *C01P 2002/77* (2013.01); *C01P 2006/40* (2013.01)

(58) Field of Classification Search
CPC .... H01M 4/525; H01M 4/0445; H01M 4/505; H01M 10/054; C01G 51/50
USPC ......................................................... 429/50
See application file for complete search history.

(56) References Cited

U.S. PATENT DOCUMENTS

| | | | | |
|---|---|---|---|---|
| 2014/0093778 A1* | 4/2014 | Askit | ...................... | C30B 29/22 429/231.3 |
| 2016/0181608 A1* | 6/2016 | Kendrick | .............. | H01M 4/525 252/182.1 |

OTHER PUBLICATIONS

Thorne et al., Investigation of P2—Na2/3Mn1/3Fe1/3Co1/3O2 for NaOIon Battery Positive Electrodes, Journal of the Electrochemical Society vol./Issue 161 (14), pp. A2232-A2236 (Year: 2014).*

(Continued)

*Primary Examiner* — Jayne L Mershon
(74) *Attorney, Agent, or Firm* — Wolf, Greenfield & Sacks, P.C.

(57) ABSTRACT

The present invention generally relates to P2-type layered materials for electrochemical devices such as Na-ion batteries with high rate performance, and methods of making or using such materials. In some embodiments, the P2-type layered material has the chemical formula $Na_x(Mn_QFe_RCo_T)O_2$. The P2-type layered material may be synthesized, for example, by a solid state reaction. In some cases, the P2-type layered material may be used as an electrode in an electrochemical device. The electrochemical device may have higher initial discharge capacities at various charge/discharge rates in galvanostatic testing compared with the initial discharge capacities of other P2-type layered materials.

6 Claims, 23 Drawing Sheets

Crystallographic data for $Na_{2/3}(Mn_{1/2}Fe_{1/4}Co_{1/4})O_2$ based on Cu $K_\alpha$ Laboratory X-ray diffraction

| | |
|---|---|
| Radiation | Cu $K_\alpha$ |
| Crystal system | Hexagonal |
| Space group | $P6_3/mmc$ (#194) |
| Lattice parameters | $a = b = 2.89449(6)$ Å<br>$c = 11.1647(3)$ Å |
| Cell volume | 81.007(4) Å$^3$ |
| Density (calculated) | 4.26386 g/cm$^3$ |
| $\lambda$ | 1.54 Å |
| $R_{wp}$ | 1.046% |
| $R_p$ | 0.691% |
| $\chi^2$ | 3.124 |

(56) References Cited

OTHER PUBLICATIONS

Berthelot et al, Electrochemical investigation of the P2—Na(x)CoO(2) phase diagram. Nat Mater. Jan. 2011;10(1):74-80. doi: 10.1038/nmat2920. Epub Dec. 12, 2010.

Buchholz et al., Toward Na-ion batteries—Synthesis and characterization of a novel high capacity Na ion intercalation material. Chem Mater. 2013;25:142-8. Epub Dec. 17, 2012.

Caballero et al., Synthesis and characterization of high-temperature hexagonal P2—$Na_{0.6}$ $MnO_2$ and its electrochemical behavior as cathode in sodium cells. J. Mater. Chem. 2002;12:1142-7. Epub Feb. 22, 2002. doi: 10.1039/b108830k.

Carlier et al., The P2—$Na_{2/3}Co_{2/3}Mn_{1/3}O_2$ phase: structure, physical properties and electrochemical behavior as positive electrode in sodium battery. Dalton Trans. Aug. 2011;40:9306-12.

Cheng et al., Simultaneous reduction of $Co^{3+}$ and $Mn^{4+}$ in P2—$Na_{2/3}Co_{2/3}Mn_{1/3}O_2$ as evidenced by x-ray absorption spectroscopy during electrochemical sodium intercalation. Chem Mater. 2014;26(2):1219-25. dx.doi.org/10.1021/cm403597h. $1^{st}$ pub. Dec. 19, 2013.

Chung, Materials for thermal conduction. App Thermal Eng. Nov. 2001;21(16):1593-1605.

De Boisse et al., P2—$Na_xMn_{1/2}Fe_{1/2}O_2$ phase used as positive electrode in Na batteries: Structural changes induced by the electrochemical (de)intercalation process. Inorg Chem. Sep. 2014;53(20):11197-205.

Han et al., Structural evolution and electrochemistry of monoclinic $NaNiO_2$ upon the first cycling process. J Power Sources. Jul. 1, 2014;258:266-71.

Hasa et al., High performance $Na_{0.5}[Ni_{0.23}Fe_{0.13}Mn_{0.63}]O_2$ cathode for sodium-ion batteries. Adv. Energy Mater. Jun. 2014;4:1400083(1-7). doi: 10/1002/aenm.201400083.

Jeschull, Functional binders at the interface of negative and positive electrodes in lithium batteries. Licenciate Thesis, Uppsala University, Disciplinary Domain of Science and Technology, Chemistry, Department of Chemistry—Angstrom, Structural Chemistry. Available from Nov. 26, 2015 Presentation Dec. 16, 2015; 58 pages.

Komaba et al., Study on the reversible electrode reaction of Na(1-x)Ni(0.5)Mn(0.5)O2 for a rechargeable sodium-ion battery. Inorg Chem. Jun. 4, 2012;51(11):6211-20. doi: 10.1021/ic300357d. Epub May 24, 2012.

Lee et al., Topochemical synthesis of sodium metal phosphate olivines for sodium-ion batteries. Chem Mater. Jul. 2011;23(16):3593-600.

Lee et al., An advanced cathode for Na-ion batteries with high rate and excellent structural stability. Phys Chem Chem Phys. Mar. 7, 2013;15(9):3304-12. doi: 10.1039/c2cp44467d. Epub Jan. 29, 2013.

Li et al., O3-type $Na(Mn_{0.25}Fe_{0.25}Co_{0.25}Ni_{0.25})O_2$: A quaternary layered cathode compound for rechargeable Na ion batteries. Electrochem Commun. Dec. 2014;49:51-4. Epub Oct. 13, 2014.

Li et al., Direct visualization of the Jahn-Teller effect coupled to Na ordering in $Na_{5/8}MnO_2$. Nat Mater. Jun. 2014;13(6):586-92. Epub May 18, 2014, doi: 10/1038/nmat3964.

Lu et al., In Situ x-ray diffraction study of P2 $Na_{2/3}$ $[Ni_{1/3}Mn_{2/3}]$ $O_2$. J Electrochem Soc. 2001;148(11):A1225-9. Epub Sep. 20, 2001.

Ma et al., Electrochemical properties of monoclinic $NaMnO_2$. J Electrochem Soc. Nov. 2011;158(12):A1307-12.

Malik et al., Kinetics of non-equilibrium lithium incorporation in LiFePO4. Nat Mater. 2011;10(3):587-90, Epub Jul. 17, 2011; doi: 10/1038/nmat3065.

Mo et al., Insights into diffusion mechanisms in P2 layered oxide materials by first-principles calculations. Chem Mater. Aug. 2014;26(18):5208-14.

Palomares et al., Na-ion batteries, recent advances and present challenges to become low cost energy storage systems. Energy Environ Sci. Feb. 2012;5:5884-901.

Palomares et al., Update on Na-based battery materials. A growing research path. Energy Environ Sci. Jun. 2013;6:2312-37.

Pan et al., Room-temperature stationary sodium-ion batteries for large-scale electric energy storage. Energy Environ Sci. Jun. 2013;6:2338-60.

Pang et al., Interplay between electrochemistry and phase evolution of the P2-type $Na_x(Fe_{1/2}Mn_{1/2})O_2$ cathode for use in sodium-ion batteries. Chem Mater. Apr. 2015;27(8):3150-8.

Shibata et al., Fast discharge process of layered cobalt oxides due to high $Na^+$ diffusion. Sci Rep. Mar. 11, 2015;5:9006(1-4). doi: 10.1038/srep09006.

Shin et al., Tin phosphide-based anodes for sodium-ion batteries: synthesis via solvotherrnal transformation of Sn metal and phase-dependent Na storage performance. Scientific Reports, Nature.com. Published online May 18, 2016;6(26195):1-10. Accessed online at https://www.nature.com/articles/srep26195?WT.feed/name=subjects_electrochemistry.

Talaie et al., Structure of the high voltage phase of layered P2—$Na_{2/3-z}[Mn_{1/2}Fe_{1/2}]O_2$ and the positive effect of Ni substitution on its stability. Energy Environ Sci. Jul. 2015;8:2512-23.

Van Der Ven et al., Lithium diffusion in layered $LixCoO_2$. Electrochem Solid-St Lett. May 2000;3(7):301-4.

Van Der Ven et al., Lithium diffusion mechanisms in layered intercalation compounds. J Power Sources. Jul. 2001;97-98:529-31.

Vassilaras et al., Electrochemical properties of monoclinic $NaNiO_2$. J Electrochem Soc. 2013;160(2):A207-11. Epub Nov. 2012.

Wu et al., $NaTiO_2$: A layered anode material for sodium-ion batteries. Energy Environ Sci. 2015;8:195-202. doi: 10.1039/c4ee03045a. Epub Oct. 28, 2014.

Xu et al., Identifying the critical role of Li substitution in P2—$Na_x[Li_yNi_zMn_{1-y-z}]O_2(0<x, y, z<1)$ intercalation cathode materials for high-energy Na-ion batteries. Chem Mater. Jan. 2014;26(2):1260-9.

Yabuuchi et al, P2-type Na(x)[Fe(1/2)Mn(1/2)]O2 made from earth-abundant elements for rechargeable Na batteries. Nat Mater. Jun. 2012;11(6):512-7. doi: 10.1038/nmat3309. Epub Apr. 29, 2012.

Yoshida et al., $NaFe_{0.5}Co_{0.5}O_2$ as high energy and power positive electrode for Na-ion batteries. Electrochem Commun. Sep. 2013;34:60-63.

Yu et al., $NaCrO_2$ cathode for high-rate sodium-ion batteries. Energy Environ Sci. May 13, 2015;8:2019-26.

Yuan et al., Synthesis and electrochemical behaviors of layered $Na_{0.67}[Mn_{0.65}Co_{0.2}Ni_{0.15}]O_2$ microflakes as a stable cathode material for sodium-ion batteries. J Mater Chem A. Jan. 2013;1:3895-9.

Liu et al., High-performance P2-type $Na_{2/3}$ $(Mn_{1/2}Fe_{1/4}Co_{1/4})O2$ cathode material with superior rate capability for Na-ion batteries. Adv Energy Mater. Nov. 18, 2015;5(22):1500944, pp. 1-5.

Thorne et al., Investigation of P2—$Na_{2/3}Mn_{2/3}Fe_{1/3Co1/3}O2$ for Na-ion battery positive electrodes. J Electrochem Soc. Oct. 2014;161(14):A2232-A2236.

\* cited by examiner

Crystallographic data for $Na_{2/3}(Mn_{1/2}Fe_{1/4}Co_{1/4})O_2$ based on Cu $K_\alpha$ Laboratory X-ray diffraction

| | |
|---|---|
| Radiation | Cu $K_\alpha$ |
| Crystal system | Hexagonal |
| Space group | $P6_3/mmc$ (#194) |
| Lattice parameters | $a = b = 2.89449(6)$ Å |
| | $c = 11.1647(3)$ Å |
| Cell volume | $81.007(4)$ Å$^3$ |
| Density (calculated) | 4.26386 g/cm$^3$ |
| $\lambda$ | 1.54 Å |
| $R_{wp}$ | 1.046% |
| $R_p$ | 0.691% |
| $\chi^2$ | 3.124 |

Fig. 4

Atomic site information for $Na_{2/3}(Mn_{1/2}Fe_{1/4}Co_{1/4})O_2$

| Atom | Wyck. | x/a | y/b | z/c | Occ. | $B_{iso}$ (Å²) |
|---|---|---|---|---|---|---|
| Na1 | 2b | 0 | 0 | 0.25 | 0.25(1) | 2.0(3) |
| Na2 | 2d | 2/3 | 1/3 | 0.25 | 0.42(2) | 2.0(3) |
| M | 2a | 0 | 0 | 0 | Mn = 1/2<br>Fe = 1/4<br>Co = 1/4 | 0.3(2) |
| O | 4f | 1/3 | 2/3 | 0.0869(5) | 1 | 0.5(1) |

Fig. 5

Selected bond distances (Å) for $Na_{0.67}(Mn_{1/2}Fe_{1/4}Co_{1/4})O_2$

| | |
|---|---|
| Na - O (x6) | 2.471(4) |
| Mn/Fe/Co - O (x6) | 1.933(3) |

Fig. 6

L3/L2 peak intensity ratio of Mn, Fe and Co in EEL spectra on P2-$Na_xMn_{1/2}Fe_{1/4}Co_{1/4}O_2$. The error bar is from averaging 5 different measurements.

| L3/L2 ratio | Pristine | Discharged to 1.5V |
|---|---|---|
| Mn | 1.61 (+/-0.04) | 1.64 (+/-0.03) |
| Fe | 3.16 (+/-0.05) | 3.17 (+/-0.03) |
| Co | 1.60 (+/-0.04) | 1.74 (+/-0.04) |

Fig. 12

Calculated Na-ion diffusivities (in cm²/s) in P2 $Na_xMnO_2$, $Na_xFeO_2$ and $Na_xCoO_2$ ($x = 0.37$ and $0.69$) at different temperatures.

|  |  | $Na_xMnO_2$ | $Na_xFeO_2$ | $Na_xCoO_2$ |
| --- | --- | --- | --- | --- |
| x=0.37 | 600 K | $1.7 \times 10^{-5}$ | $2.4 \times 10^{-5}$ | $1.6 \times 10^{-5}$ |
|  | 900 K | $3.7 \times 10^{-5}$ | $3.7 \times 10^{-5}$ | $3.8 \times 10^{-5}$ |
|  | 1200 K | $8.2 \times 10^{-5}$ | $8.9 \times 10^{-5}$ | $8.4 \times 10^{-5}$ |
| x=0.69 | 600 K | $4.5 \times 10^{-6}$ | $7.5 \times 10^{-6}$ | $7.9 \times 10^{-6}$ |
|  | 900 K | $1.9 \times 10^{-5}$ | $1.3 \times 10^{-5}$ | $2.1 \times 10^{-5}$ |
|  | 1200 K | $2.6 \times 10^{-5}$ | $4.0 \times 10^{-5}$ | $3.3 \times 10^{-5}$ |

Fig. 15

Electronic conductivity of P2-$Na_{2/3}(Mn_{1/2}Fe_{1/2})O_2$, P2-$Na_{2/3}(Mn_{1/2}Co_{1/2})O_2$, P2-$Na_{2/3}(Mn_{1/2}Fe_{1/4}Co_{1/4})O_2$ and P2-$Na_{0.67}(Mn_{0.65}Co_{0.2}Ni_{0.15})O_2$

| Material | e- conductivity (S/m) |
|---|---|
| P2-$Na_{2/3}Mn_{1/2}Fe_{1/2}O_2$ | 2.4291E-05 |
| P2-$Na_{2/3}Mn_{1/2}Co_{1/2}O_2$ | 2.61596E-05 |
| P2-$Na_{2/3}Mn_{1/2}Fe_{1/4}Co_{1/4}O_2$ | 3.03451E-05 |
| P2-$Na_{0.67}Mn_{0.65}Co_{0.2}Ni_{0.15}O_2$ | 2.52067E-05 |

Fig. 16

BATTERY MATERIALS INCLUDING P2-TYPE LAYERED MATERIALS FOR ELECTROCHEMICAL DEVICES

RELATED APPLICATIONS

This application claims the benefit of U.S. Provisional Patent Application Ser. No. 62/328,659, filed Apr. 28, 2016, entitled "High Performance P2-Type Cathode Materials with Superior Rate Capability for Na-Ion Batteries," incorporated herein by reference in its entirety.

FIELD

The present invention generally relates to electrochemical devices such as Na-ion batteries and, in particular, to P2-type layered materials.

BACKGROUND

Because of the increasing demand from energy storage devices and the earth abundance of sodium relative to lithium, sodium-ion (Na-ion) batteries have been considered as a promising alternative to Li-ion batteries.

It has been a challenge in the Na-ion battery field to improve the rate performance of P2-type layered materials that are layered sodium (Na) transition metal (TM) oxides ($Na_x(TM)O_2$) because these layered cathode materials are prone to long-range ordering and phase transitions that hinder performance. Na-vacancy ordering may trap vacancies thereby reducing the Na diffusivity, as has been observed for Li. The flat potential associated with the two-phase region of a first order phase transition causes an electrode to react heterogeneously, thereby degrading the effective rate performance. In addition, phase transitions require local over-potential to nucleate, followed by a strong current concentration once they are nucleated.

The approach of mixing transition metals in layered sodium transition metal oxide materials has been used to attempt to suppress phase transitions by perturbing the ordering of the transition metal sublattice and prevent sodium ions from ordering. A measure of rate performance is the initial discharge capacity of a battery incorporating the layered cathode material when the battery is subjected to galvanostatic testing at a series of rates of charge and discharge.

The main objective in improving the rate performance of layered cathode materials incorporating manganese (Mn) has been to suppress the phase transition known as monoclinic distortion. Monoclinic distortion involves the creation of a two-phase region comprising P2 phase and P'2 monoclinic phase. Monoclinic distortion is an effect of the reduction of $Mn^{4+}$ to $Mn^{3+}$ during the discharge of a battery incorporating the layered cathode material during galvanostatic testing.

One higher voltage redox couple that was used to decrease the amount of reduction of $Mn^{4+}$ to $Mn^{3+}$ was nickel (Ni), $Ni^{3+}$ and $Ni^{2+}$, in the layered cathode material $Na_{0.5}(Ni_{0.23}Fe_{0.13}Mn_{0.63})O_2$ (P2-MFN). This layered cathode material composition resulted in no phase transition at the end of discharge due to redox compensation by Ni. This material showed a high initial discharge capacity at a low charge/discharge rate. However, this material exhibited poor rate performance.

Another higher voltage redox couple that was used to decrease the amount of reduction of $Mn^{4+}$ to $Mn^{3+}$ was cobalt (Co) $Co^{3+}$ and $Co^{2+}$, in the layered cathode material $Na_{2/3}(Mn_{1/3}Fe_{1/3}Co_{1/3})O_2$ (P2-MFC$_{1/3}$). Although this cathode material did not have a phase transition at the end of discharge, the Co redox couple had a limited initial capacity in the high voltage region, at ~126 mAh/g for an upper voltage cutoff of 4.1 V and rate C/10 (10 mA/g). This material also exhibited poor rate performance, with an initial discharge capacity of ~78 mAh/g at 1 C rate (100 mA/g), about 60% of the C/10 rate capacity, at with a large increase in polarization at higher rates. At an upper voltage cutoff of 4.3 V, the irreversible capacity increased to 31 mAh/g from ~15 mAh/g for an upper voltage cutoff of 4.1 V.

Layered cathode materials with better rate performance than the aforementioned Mn-containing materials included $Na(Fe_{1/2}Co_{1/2})O_2$ (O3-FC) and carbon-coated $NaCrO_2$ (O3-CCr). These materials had slower declines in performance with rate than did the Mn-containing materials, but had significantly lower initial discharge capacities at low charge/discharge rates than did P2-MFN. Thus, improvements in performance of such materials are needed.

SUMMARY

The present invention generally relates to P2-type layered materials for electrochemical devices such as Na-ion batteries with high rate performance. The subject matter of the present invention involves, in some cases, interrelated products, alternative solutions to a particular problem, and/or a plurality of different uses of one or more systems and/or articles.

In one aspect, the present invention is generally directed to a composition. In some embodiments, the composition is a composition comprising a P2-type layered material having a chemical formula $Na_X(Mn_QFe_RCo_T)O_2$, wherein X has a value of greater than or equal to 0 and less than or equal to 1, Q has a value of greater than or equal to 0.34 and less than or equal to 0.60, R has a value of greater than or equal to 0.20 and less than or equal to 0.33, and T has a value of greater than or equal to 0.20 and less than or equal to 0.33.

In another aspect, the present invention is generally directed to a method of making a composition, including any of the compositions described herein. In some embodiments, the method of making a composition is a method comprising mixing, to form a mixture, at least one source of sodium, at least one source of manganese, at least one source of iron, and at least one source of cobalt, in a mass ratio such that sodium, manganese, iron, and cobalt are present in the mixture in a mole ratio Na:Mn:Fe:Co of X:Q:R:T, wherein X has a value of greater than or equal to 0.40 and less than or equal to 1, Q has a value of greater than or equal to 0.34 and less than or equal to 0.60, R has a value of greater than or equal to 0.20 and less than 0.33, and T has a value of greater than or equal to 0.20 and less than 0.33; and pressing and exposing the mixture to heat to form a solid material.

In yet another aspect, the present invention is generally directed to a method of using a composition, including any of the compositions described herein. In some embodiments, the method of using a composition is a method comprising charging or discharging an electrochemical device comprising an electrode comprising a composition comprising a P2-type layered material with the chemical formula $Na_X(Mn_QFe_RCo_T)O_2$, wherein X has a value of greater than or equal to 0 and less than or equal to 1, Q has a value of greater than 0.34 and less than or equal to 0.60, R has a value of greater than or equal to 0.20 and less than 0.33, and T has a value of greater than or equal to 0.20 and less than 0.33.

In another aspect, the present invention encompasses methods of making one or more of the embodiments described herein. In still another aspect, the present invention encompasses methods of using one or more of the embodiments described herein.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 4 tabulates crystallographic data for P2-$Na_{2/3}$ $(Mn_{1/2}Fe_{1/4}Co_{1/4})O_2$ based on XRD, in accordance with one embodiment of the invention as in FIG. 1;

FIG. 5 tabulates atomic site information for P2-$Na_{2/3}$ $(Mn_{1/2}Fe_{1/4}Co_{1/4})O_2$ as determined from XRD, in accordance with one embodiment of the invention as in FIG. 1;

FIG. 6 tabulates selected bond lengths for P2-$Na_{2/3}$ $(Mn_{1/2}Fe_{1/4}Co_{1/4})O_2$ as determined from XRD, in accordance with one embodiment of the invention as in FIG. 1;

FIG. 12 tabulates the L3/L2 peak intensity ratios of Mn, Fe and Co for P2-MFC as determined from EELS spectra like that in FIG. 11, in certain embodiments of the invention;

FIG. 15 tabulates Na-ion diffusivities (in $cm^2/s$) in P2-$Na_xMnO_2$, $Na_xFeO_2$ and $Na_xCoO_2$ (x=0.37 and x=0.69) calculated from ab-initio molecular dynamics simulations at different temperatures, in certain embodiments of the invention;

FIG. 16 tabulates the electronic conductivity of P2-MFC in comparison with the electronic conductivities of several P2-type layered materials, according to one embodiment of the invention;

DETAILED DESCRIPTION

The present invention generally relates to P2-type layered materials for electrochemical devices such as Na-ion batteries with high rate performance, and methods of making or using such materials. In some embodiments, the P2-type layered material has the chemical formula $Na_X(Mn_QFe_R$-$Co_T)O_2$. The P2-type layered material may be synthesized, for example, by a solid state reaction. In some cases, the P2-type layered material may be used as an electrode in an electrochemical device. The electrochemical device may have higher initial discharge capacities at various charge/ discharge rates in galvanostatic testing compared with the initial discharge capacities of other P2-type layered materials.

Figure 1:
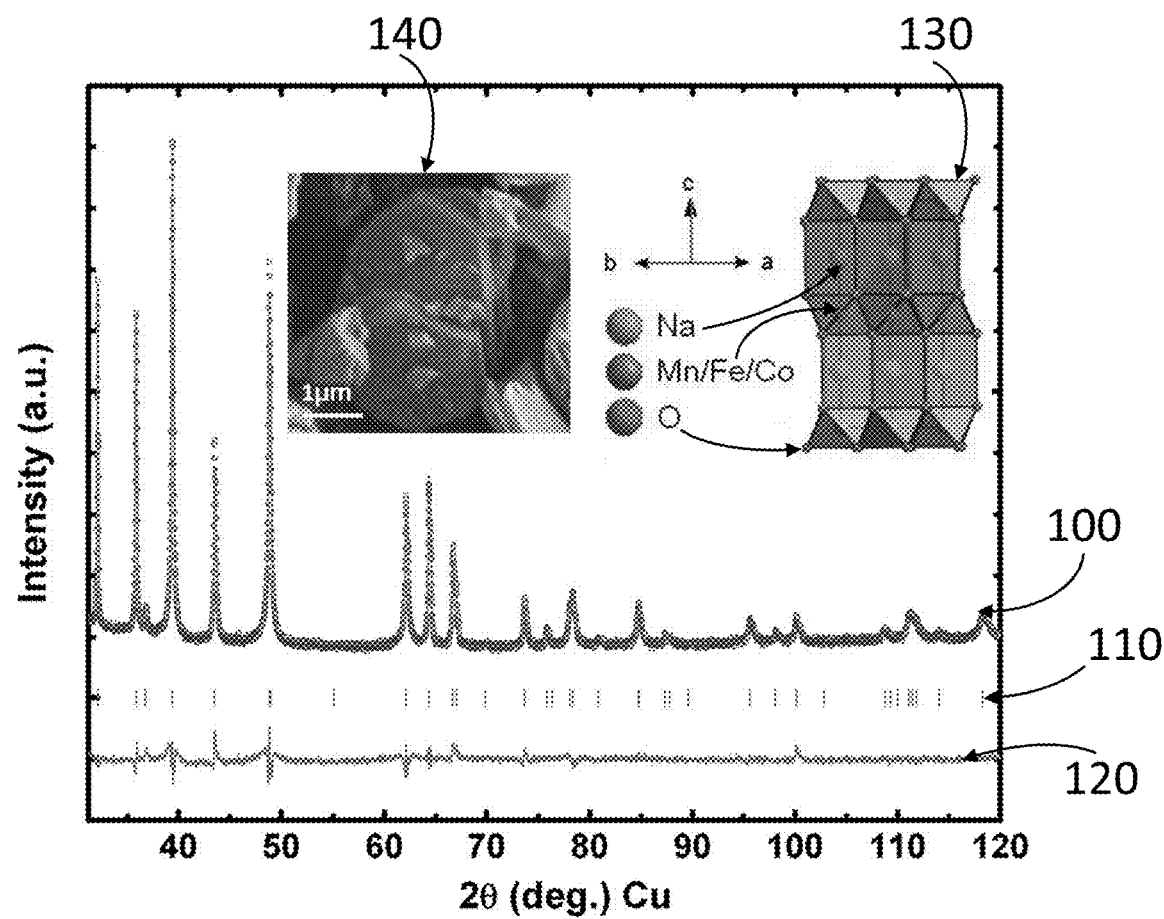
FIG. 1 illustrates an experimental copper K-alpha x-ray diffraction (XRD) pattern of a P2-type layered material with the chemical formula $Na_{2/3}(Mn_{1/2}Fe_{1/4}Co_{1/4})O_2$ (P2-$Na_{2/3}$ $(Mn_{1/2}Fe_{1/4}CO_{1/4})O_2$), with a calculated XRD pattern using Rietveld refinement superimposed over the experimental pattern (FIG. 1,100), along with the peak positions (FIG. 1, 110) and differences between the experimental and calculated patterns (FIG. 1, 120), a scanning electron microscopy image of the synthesized material (FIG. 1, 140) and a schematic diagram of the crystal structure of the material (FIG. 1, 130), in accordance with one embodiment of the invention.

Some embodiments of the invention are directed to P2-type layered materials. P2-type layered materials generally structurally comprise stacked layers of elements. The structure of an exemplary P2-type layered material is depicted in FIG. 1, 130. This stacked structure allows for the two-dimensional diffusion of ions such as sodium into and out of the structure, which may be useful, for example, when used as a cathode in a battery or other electrochemical device during discharging and charging. P2-type layered materials, as would be known by those of ordinary skill in the art, have a specific arrangement of atoms in a crystal lattice, with different atoms in different layers within the lattice, e.g., as is shown in FIG. 1 with Na, Mn/Fe/Co, and O on different layers. The "P" designation in "P2-type" refers to the local structure around $Na^+$ as a prismatic oxygen cage, and the "2" designation in "P2-type" refers to the repeat period of the transition metal stacking perpendicular to Na layers. Such atomic arrangements can be determined, for example, using X-ray powder diffraction (XRD) with Cu K-alpha radiation (wavelength of 1.541 Angstroms) with Rietveld refinement, e.g., as discussed in Example 1. For example, the P2-type layered materials may have the chemical formula $Na_X(Mn_QFe_RCo_T)O_2$, in certain embodiments.

In some embodiments, Q has a value of greater than 0.34, greater than 0.36, greater than 0.38, greater than 0.40, greater than 0.42, greater than 0.44, greater than 0.46, greater than 0.48, greater than 0.50, greater than 0.52, greater than 0.54, greater than 0.56, or greater than 0.58. In some embodiments, Q has a value of at most 0.60, at most 0.58, at most 0.56, at most 0.54, at most 0.52, at most 0.50, at most 0.48, at most 0.46, at most 0.44, at most 0.42, at most 0.40, at most 0.38, or at most 0.36. Combinations of these Q values are also possible; for example, Q may have a value greater than 0.34 and less than or equal to 0.60, or greater than or equal to 0.45 and less than or equal to 0.55. In some cases, Q has a value of 0.50.

In some embodiments, R has a value of at least 0.20, at least 0.21, at least 0.22, at least 0.23, at least 0.24, at least 0.25, at least 0.26, at least 0.27, at least 0.28, at least 0.29, at least 0.30, at least 0.31, or at least 0.32. In some embodiments, R has a value of less than 0.33, less than 0.32, less than 0.31, less than 0.30, less than 0.29, less than 0.28, less than 0.27, less than 0.26, less than 0.25, less than 0.24, less than 0.23, less than 0.22, or less than 0.21. Combinations of these R values are also possible; for example, R may have a value greater than or equal to 0.20 and less than 0.33, or greater than or equal to 0.20 and less than 0.30. In some cases, R has a value of 0.25.

In some embodiments, T has a value of at least 0.20, at least 0.21, at least 0.22, at least 0.23, at least 0.24, at least 0.25, at least 0.26, at least 0.27, at least 0.28, at least 0.29, at least 0.30, at least 0.31, or at least 0.32. In some embodiments, T has a value of less than 0.33, less than 0.32, less than 0.31, less than 0.30, less than 0.29, less than 0.28, less than 0.27, less than 0.26, less than 0.25, less than 0.24, less than 0.23, less than 0.22, or less than 0.21. Combinations of these T values are also possible; for example, T may have a value greater than or equal to 0.20 and less than 0.33, or greater than or equal to 0.20 and less than 0.30. In some cases, T has a value of 0.25.

In some embodiments, X has a value of at least 0.30, at least 0.35, at least 0.40, at least 0.45, at least 0.50, at least 0.55, at least 0.60, at least 0.65, at least 0.70, at least 0.75, at least 0.80, at least 0.85, at least 0.90, or at least 0.95. In some embodiments, X has a value of at most 1.0, at most 0.95, at most 0.90, at most 0.85, at most 0.80, at most 0.75, at most 0.70, at most 0.65, at most 0.60, at most 0.55, at most 0.50, at most 0.45, at most 0.40, or at most 0.35. Combinations of these X values are also possible; for example, X may have a value greater than or equal to 0.40 and less than or equal to 1.0, or greater than or equal to 0.60 and less than or equal to 0.95. In some cases, X has a value of 0.67.

For example, in one set of embodiments, X has a value of greater than or equal to 0.14 and less than or equal to 0.95, Q has a value of 0.50, R has a value of 0.25, and T has a value of 0.25.

Generally, in the case of P2-type layered materials, the reactants can be mixed in a mole ratio such that the electrode material is initially neither in the fully charged state nor in the fully discharged state. For example, the fully charged state of a P2-type layered material comprising manganese, iron, and cobalt and acting as a cathode corresponds to the chemical formula $Na_X(Mn_QFe_RCo_T)O_2$, where X has a value of 0, meaning that there is no sodium present in the material. Under these circumstances, the ratio of the number of moles of sodium in the material to the total number of moles of transition metals in the material, X:(Q+R+T), equals 0. The fully discharged state of a P2-type layered material comprising manganese, iron, and cobalt and acting as a cathode corresponds to the chemical formula $Na_X(Mn_QFe_RCo_T)O_2$, where X has a value of 1, meaning that there is a maximum amount of sodium present in the material. Under these circumstances, the ratio of the number of moles of sodium in the material to the total number of moles of transition metals in the material, X:(Q+R+T), equals 1. In accordance with some embodiments of the invention, the material may be synthesized with X having a value of greater than or equal to 0.40 and less than or equal to 0.95. For example, in one embodiment of the invention the material may be synthesized with X having a value of 0.67. In another embodiment of the invention, the material may be synthesized with X having a value of 0.5. In accordance with some embodiments of the invention, the material may be synthesized with X having a value of greater than or equal to 0.60 and less than or equal to 0.85.

In addition, certain aspects of the invention are generally directed to methods of making P2-type layered materials, for example, having the chemical formula $Na_X(Mn_QFe_RCo_T)O_2$. In some cases, such materials may be synthesized by a solid state reaction, for example, using one or more sources of sodium, manganese, iron, and cobalt. Such materials may be pressed and/or heated under various conditions to form a solid material. Under conditions such as those described herein, P2-type layered materials can be formed.

In some embodiments, one or more reactants may be mixed together to form a mixture. Non-limiting examples of sources of sodium that may be included in the mixture are sodium carbonate ($Na_2CO_3$), sodium hydroxide (NaOH), sodium oxide ($Na_2O$), and sodium peroxide ($Na_2O_2$). Non-limiting examples of sources of manganese and oxygen that may be included in the mixture are manganese oxides including manganese (II) oxide (MnO), manganese (II, III) oxide ($Mn_3O_4$, also written as $MnO.Mn_2O_3$), manganese (III) oxide ($Mn_2O_3$), manganese (IV) oxide (also called manganese dioxide, $MnO_2$), manganese (VI) oxide ($MnO_3$), manganese (VII) oxide ($Mn_2O_7$), manganese carbonate, manganese oxalate, manganese nitrate, manganese acetate, and manganese hydroxide. Non-limiting examples of sources of iron and oxygen that may be included in the mixture are iron oxides including iron (II) oxide (FeO); iron (II, III) oxides including magnetite ($Fe_3O_4$), $Fe_4O_5$, $Fe_5O_7$, $Fe_{25}O_{32}$, and $Fe_{13}O_{19}$; iron (III) oxide ($Fe_2O_3$) in alpha phase (hematite), beta phase, gamma phase (maghemite), and epsilon phase; iron carbonate; iron oxalate; iron nitrate; iron acetate; and iron hydroxide. Non-limiting examples of sources of cobalt and oxygen that may be included in the mixture are cobalt oxides including cobalt (II) oxide (CoO), cobalt (III) oxide ($Co_2O_3$), cobalt (II, III) oxide ($CO_3O_4$), cobalt carbonate, cobalt oxalate, cobalt nitrate, cobalt acetate, and cobalt hydroxide. Reactants that are sources of more than one transition metal and oxygen are also possible. Non-limiting examples of sources of more than one transition metal and oxygen include Jacobsite (iron(II, III) manganese oxide, $MnFe_2O_4$) and Bixbyite ($(Mn,Fe)_2O_3$). Any combination of any of the above-described sources may be used in various embodiments. Additional reactants comprising other sources of some or all of these elements may also be included in the mixture in other embodiments.

The reactants may be mixed in a ratio such that each chemical element in the material (except oxygen) is present in the mixture in a mole ratio corresponding to the mole ratio of elements in the material to be synthesized, e.g., to produce any of the mole ratios discussed above. The oxygen may be partially driven off into vapor in some embodiments while heating the reactants in the synthesis reaction.

In some embodiments, methods of making the product may comprise grinding the mixture of reactants, e.g., to maximize the contacting surface area between reactants and minimize reactant particle volume. Grinding the mixture may involve, in certain embodiments, the use of a grinder. Non-limiting examples of suitable grinders are ball mills, pebble mills, vertical shaft impactor mills, tower mills, rod mills, autogenous mills, semi-autogenous grinding mills, high pressure grinding rolls, and edge runners. The grinder may comprise in some cases a high-energy ball mill. The high-energy ball mill may comprise balls comprising stone or metal (e.g., iron, steel, stainless steel, etc.). In some cases, a pebble mill comprising pebbles comprising quartz or silica may instead be used. Methods of making the product may comprise, in some embodiments, pressing the ground mixture of reactants into pellets, monoliths, or other solid forms.

In certain embodiments of the invention, the pressed material may be calcined in a furnace. Calcining, also known as calcination, comprises, according to certain embodiments, exposing the material to an environment with a high temperature, and in some cases, maintaining the temperature at the high temperature. An environment to which the material is exposed in which the temperature can be controlled may be, in some embodiments, a furnace. The furnace used for calcination, according to some embodiments may be a tube furnace. In some embodiments, the furnace may be a box furnace. Any other suitable shape for a furnace is also possible.

Heating the mixture may comprise, according to some embodiments, exposing the material to temperature rate increase of at least 0.1 degrees Celsius per minute, at least 0.5 degrees Celsius per minute, at least 1 degree Celsius per minute, at least 2 degrees Celsius per minute, at least 3 degrees Celsius per minute, at least 4 degrees Celsius per minute, at least 5 degrees Celsius per minute, at least 6 degrees Celsius per minute, at least 10 degrees Celsius per minute, or at least 15 degree Celsius per minute. The rate of temperature increase in some cases may be at most 20 degrees Celsius per minute, at most 15 degrees Celsius per minute, at most 10 degrees Celsius per minute, at most 6 degrees Celsius per minute, at most 5 degrees Celsius per minute, at most 4 degrees Celsius per minute, at most 3 degrees Celsius per minute, at most 2 degrees Celsius per minute, at most 1 degree Celsius per minute, or at most 0.5 degrees Celsius per minute. Combinations of any of these rates of temperature increase are also possible; for example, the rate of temperature increase in the furnace in some cases may be greater than or equal to 0.1 degrees Celsius per minute and less than or equal to 20 degrees Celsius per minute, or greater than or equal to 4 degrees Celsius per minute and less than or equal to 6 degrees Celsius per minute. In certain embodiments, the rate of temperature increase in the furnace may be equal to 5 degrees Celsius per minute.

In certain embodiments, the temperature to which the mixture is exposed for calcination is greater than or equal to a decomposition temperature or transition temperature for at least one reactant. A non-limiting example of a transition temperature is a melting temperature. In addition, in certain embodiments, the temperature to which the mixture is exposed for calcination is less than or equal to a decomposition temperature or transition temperature for at least one reactant. A non-limiting example of a transition temperature is a boiling temperature. For some embodiments, for example, the material may be exposed to a temperature of greater than or equal to 800 degrees Celsius and less than or equal to 1000 degrees Celsius (for example, about 900 degrees Celsius).

The time for which the temperature is maintained during calcination may be several hours. In some embodiments, the material may be exposed to such temperatures for at least 2 hours, at least 4 hours, at least 6 hours, at least 8 hours, at least 10 hours, at least 12 hours, at least 14 hours, at least 16 hours, at least 20 hours, at least 24 hours, or at least 36 hours. In some embodiments, the material is exposed to temperatures for at most 48 hours, at most 36 hours, at most 24 hours, at most 20 hours, at most 16 hours, at most 14 hours, at most 12 hours, at most 10 hours, at most 8 hours, at most 6 hours, or at most four hours. Combinations of any of these time are also possible; for example, the temperature may be maintained for greater than or equal to 2 hours and less than or equal to 48 hours, or for greater than or equal to 6 hours and less than or equal to 24 hours.

In certain embodiments of the invention, after formation, the calcined material may be quenched, e.g., by exposing the material to lower temperatures such as room temperature. In some cases, this may be performed at a fairly rapid rate. For example, the calcined material may be exposed to a quenching material having a high thermal conductivity (e.g., greater than 200 W m$^{-1}$ K$^{-1}$). Non-limiting examples of materials having a high thermal conductivity are copper, aluminum, brass, gold, diamond, beryllium oxide, aluminum nitride, and silicon carbide.

Certain embodiments of the invention are generally directed to electrochemical devices such as batteries, comprising P2-type layered materials such as those described herein. An electrochemical device comprising P2-type layered materials may be in some embodiments a galvanic cell, also known as a voltaic cell. Non-limiting examples of types of galvanic cells include batteries that may in some cases be rechargeable, and fuel cells. In some embodiments, the battery is a sodium ion (Na-ion) battery. An electrochemical device comprising P2-type layered materials may be in some embodiments an electrolytic cell.

In accordance with some embodiments, the electrochemical device comprises a first electrode that comprises the P2-type layered material. The first electrode may be a cathode in some embodiments. The first electrode may comprise the P2-type layered material in an amount of at least 10 wt %, at least 20 wt %, at least 30 wt %, at least 40 wt %, at least 50 wt %, at least 60 wt %, at least 70 wt %, at least 80 wt %, or at least 90 wt % versus the total weight of the first electrode. The first electrode may comprise the P2-type layered material in an amount of at most 100 wt %, at most 90 wt %, at most 80 wt %, at most 70 wt %, at most 60 wt %, at most 50 wt %, at most 40 wt %, at most 30 wt %, or at most 20 wt % versus the total weight of the first electrode. Combinations of any of these weight percentages are also possible; for example, the weight percentage of the first electrode that comprises the P2-type layered material may be between 10 wt % and 100 wt %, or between 60 wt % and 100 wt %. The first electrode may in some cases comprise 80 wt % of the P2-type layered material.

In some cases, the electrochemical device comprises a first electrode that further comprises an additive. The additive may, according to certain embodiments, be carbon black. The first electrode may comprise an additive in an amount of at least 0 wt %, at least 3 wt %, at least 6 wt %, at least 9 wt %, at least 12 wt %, at least 15 wt %, at least 18 wt %, at least 21 wt %, at least 24 wt %, or at least 27 wt % versus the total weight of the first electrode. The first electrode may comprise the additive in an amount of at most 30 wt %, at most 27 wt %, at most 24 wt %, at most 21 wt %, at most 17 wt %, at most 15 wt %, at most 12 wt %, at most 9 wt %, at most 6%, or at most 3 wt % versus the total weight of the first electrode. Combinations of any of these weight percentages are also possible; for example, the weight percentage of the first electrode that comprises the additive may be between 0 wt % and 30 wt %, or between 12 wt % and 18 wt %. The first electrode may in some cases comprise 15 wt % of the additive.

In some cases, the electrochemical device comprises a first electrode that further comprises a binder. A binder is in some embodiments electrochemically inert, and may not directly participate in the chemical reactions occurring in the electrochemical device. A binder may be polymeric. Non-limiting examples of types of polymeric binders are poly (vinylidene-fluoride) (PVDF), polytetrafluoroethylene (PTFE), fluoroelastomers (FKM), polyurethane, polyamide, polyacrylic acid, polyacrylate, polyacrylic elastomers (ACM rubber), ethylene propylene diene monomer (M-class) rubber (EPDM), ethylene vinyl alcohol (EVOH), polyacrylonitrile (PAN), butadiene rubber (BR), acrylonitrile butadiene rubber (NBR), and styrene-butadiene rubber (SBR). For certain embodiments, the binder comprises polytetrafluoroethylene.

The first electrode may comprise a binder in an amount of at least 0 wt %, at least 1 wt %, at least 2 wt %, at least 3 wt %, at least 4 wt %, at least 5 wt %, at least 6 wt %, at least 7 wt %, at least 8 wt %, or at least 9 wt % versus the total weight of the first electrode. The first electrode may comprise the binder in an amount of at most 10 wt %, at most 9 wt %, at most 8 wt %, at most 7 wt %, at most 6 wt %, at most 5 wt %, at most 4 wt %, at most 3 wt %, at most 2%, or at most 1 wt % versus the total weight of the first electrode. Combinations of any of these weight percentages are also possible; for example, the weight percentage of the first electrode that comprises the binder may be between 0 wt % and 10 wt %, or between 3 wt % and 7 wt %. The first electrode may in some cases comprise 5 wt % of the binder.

In accordance with some embodiments, the electrochemical device comprises a second electrode. The second electrode may comprise materials of the types comprising carbon-based materials (e.g. graphene, amorphous carbon), alloy-based materials (e.g., Sn—Cu alloy, Sn—Ni alloy), metal oxides (e.g., $Al_2O_3$), metal sulfides (e.g., $Mn_xS_y$), metal phosphides (e.g., $Sn_4P_3$), titanium-based materials (e.g., $Ti_yO_r$), organic materials (e.g., $C_yH_zO_r$, cellulose), and organic composite materials (e.g., cellulose-tin composite). The second electrode may in some cases comprise sodium metal.

The electrochemical device may comprise an electrolyte, in some embodiments. The electrolyte may comprise a liquid electrolyte, a polymer gel electrolyte, or a solid electrolyte. Non-limiting examples of types of solid electrolytes are ceramics, glasses, and solid polymers. Non-limiting examples of types of liquid electrolytes are non-aqueous liquid electrolytes, aqueous liquid electrolytes, and ionic liquid electrolytes. Non-limiting examples of negative ions present in electrolyte salts employed in liquid electrolytes for sodium ion (Na-ion) batteries are $[ClO_4]^-$, $[PF_6]^-$, $[BR_4]^-$, $[CF_3SO_3]^-$, and $[N(CF_3SO_2)_2]^-$. In certain embodiments, the electrolyte salt employed in the liquid electrolyte comprises $NaBF_4$. The electrolyte salt may be present in the liquid electrolyte, in some cases, in a concentration of at least 0.1 M, at least 0.2 M, at least 0.3 M, at least 0.4 M, at least 0.5 M, at least 0.6 M, at least 0.7 M, at least 0.8 M, at least 0.9 M, at least 1 M, at least 1.1 M, at least 1.2 M, at least 1.5 M, or at least 1.8 M. The electrolyte salt may be present in the liquid electrolyte, in some cases, in a concentration of at most 2.0 M, at most 1.8 M, at most 1.5 M, at most 1.2 M, at most 1.1 M, at most 1 M, at most 0.9 M, at most 0.8 M, at most 0.7 M, at most 0.6 M, at most 0.5 M, at most 0.4 M, at most 0.3 M, or at most 0.2 M. Combinations of electrolyte concentrations are also possible; for example, the electrolyte salt may be present in the liquid electrolyte, in some cases, in a concentration between 0.1 M and 2 M. The electrolyte salt may in certain embodiments be present in the liquid electrolyte in a concentration of 1 M.

Non-limiting examples of solvents employed in non-aqueous liquid electrolytes for sodium ion (Na-ion) batteries are linear organic carbonates (e.g., ethylene carbonate, diethyl carbonate, dimethyl carbonate, ethylmethyl carbonate, propylene carbonate), cyclic organic carbonates, phosphates (e.g., trimethyl phosphate), esters, and ethers. Mixtures of more than one solvent in the non-aqueous liquid electrolyte are also possible. For example, according to certain embodiments the liquid electrolyte comprises ethylene carbonate and diethyl carbonate in a mixture. In certain embodiments, the volume ratio of ethylene carbonate to diethyl carbonate in the mixture may be at least 1:2, at least 5:8, at least 3:4, at least 1:1, at least 4:3, or at least 8:5. In certain embodiments, the volume ratio of ethylene carbonate to diethyl carbonate in the mixture may be at most 2:1, at most 8:5, at most 4:3, at most 1:1, at most 3:4, or at most 5:8. Combinations of these volume ratios are also possible; for example, the volume ratio of ethylene carbonate to diethyl carbonate in the mixture may be between 1:2 and 2:1. In some cases, the volume ratio of ethylene carbonate to diethyl carbonate in the mixture may be 1:1.

In accordance with some embodiments, the electrochemical device further comprises a separator. The separator may be positioned physically in between the first electrode and the second electrode of the electrochemical device in order to prevent physical contact between the first electrode and the second electrode of the electrochemical device, thereby preventing electrical short-circuiting of the electrochemical device. The separator, in some cases, may comprise materials that are electrical insulators, meaning that the separator may comprise materials that do not conduct electricity under the conditions of use of the electrochemical device. Separator may be of the following non-limiting types: microporous separators (comprising e.g., polyolefins), nonwovens (comprising e.g. glass fibers), ion-exchange membranes (e.g., cation exchange membranes, anion exchange membranes), supported liquid membranes (comprising microporous substrates comprising e.g. polypropylene), polymer electrolytes, and solid ion conductors. In certain embodiments, the separator may comprise a nonwoven, wherein the nonwoven is a porous fabric (in the form of e.g., a sheet, a web, a matt) comprising a random array of fibers. The nonwoven may comprise a glass fiber filter. In some cases, the glass fiber filter may comprise borosilicate glass.

Electrochemical devices comprising the P2-type layered material may be assembled in an inert atmosphere in some embodiments of the invention. In some cases, the inert atmosphere may be accomplished by assembling the electrochemical devices in an argon-filled glovebox.

A electrochemical device comprising the P2-type layered material may in some embodiments comprise a commercially available Swagelok junction as the cell body. Other suitable electrochemical device cell bodies are also possible. In some cases, an in situ electrochemical device may be designed for use with X-ray diffraction during electrochemical cycling of the electrochemical device. The in situ electrochemical device may comprise a Be window.

An electrochemical device comprising the P2-type layered material may be charged or discharged, in some embodiments of the invention. Charging or discharging may in certain embodiments be carried out under galvanostatic conditions, meaning that the current through the electrochemical device is held constant.

In accordance with some embodiments of the invention, the electrochemical device comprising the P2-type layered material may first be discharged to a voltage of at most 2.0 V, at most 1.9 V, at most 1.8 V, at most 1.7 V, at most 1.6 V, at most 1.5 V, at most 1.4 V, at most 1.3 V, at most 1.2 V, at most 1.1 V, at most 1.0 V, at most 0.8 V, at most 0.6 V, or at most 0.5 V. In some embodiments, the electrochemical device may first be discharged to a voltage of at least 0.4 V, at least 0.5 V, at least 0.6 V, at least 0.8 V, at least 1.0 V, at least 1.1 V, at least 1.2 V, at least 1.3 V, at least 1.4 V, at least 1.5 V, at least 1.6 V, at least 1.7 V, at least 1.8 V, or at least 1.9 V. Combinations of initial discharge voltages are also possible; for example, the electrochemical device may first be discharged to a voltage between 2.0 V and 0.4 V, or between 1.6 V and 1.0 V. In some cases, the electrochemical device may first be discharged to 1.5 V.

The initial discharge may occur at a rate of at most C/2, at most C/4, at most C/6, at most C/8, at most C/10, at most C/12, at most C/14, at most C/16, or at most C/18, in some embodiments. C-rate is a measure of the rate at which the electrochemical device is discharged relative to its maximum capacity; for example, a rate of C/2 (equivalent to 0.5 C) means that the discharge current will discharge the entire electrochemical device in 2 hours. The initial discharge may occur at a rate of at least C/20, at least C/18, at least C/16, at least C/14, at least C/12, at least C/10, at least C/8, at least C/6, or at least C/4. Combinations of initial discharge rates are also possible; for example, the electrochemical device may first be discharged at a rate between C/2 and C/20, or between C/8 and C/20. In some embodiments, the electrochemical device may first be discharged at a rate of C/10 (equivalent to 0.1 C).

The electrochemical device comprising the P2-type layered material may then be cycled in slow charge fast discharge (SCFD) mode or in fast charge fast discharge mode (FCFD).

In SCFD mode, the electrochemical device may be charged at a rate of at most C/2, at most C/4, at most C/6, at most C/8, at most C/10, at most C/12, at most C/14, at most C/16, or at most C/18, in some embodiments. The electrochemical device may be charged in SCFD mode at a rate of at least C/20, at least C/18, at least C/16, at least C/14, at least C/12, at least C/10, at least C/8, at least C/6, or at least C/4. Combinations of charge rates in SCFD mode are also possible; for example, the electrochemical device may be charged at a rate between C/2 and C/20, or between C/8 and C/20. In some embodiments, the electrochemical device may be charged at a rate of C/10.

In SCFD mode, the electrochemical device may be discharged at a rate of at least C/20, at least C/10, at least C/2, at least 1 C, at least 2 C, at least 5 C, at least 10 C, or at least 20 C, or at most 30 C. The electrochemical device may be discharged in SCFD mode at a rate of at most 40 C, at most 30 C, at most 20 C, at most 10 C, at most 5 C, at most 2 C, at most 1 C, at most C/2, or at most C/10. Combinations of discharge rates in SCFD mode are also possible; for example, the electrochemical device may be discharged at a rate between C/20 and 40 C, or between C/10 and 40 C.

By contrast, in FCFD mode, the electrochemical device may be charged and discharged at the same rate, at a rate of at least C/20, at least C/10, at least C/2, at least 1 C, at least 2 C, at least 5 C, at least 10 C, or at least 20 C, or at most 30 C. The electrochemical device may be charged/discharged in FCFD mode at a rate of at most 40 C, at most 30 C, at most 20 C, at most 10 C, at most 5 C, at most 2 C, at most 1 C, at most C/2, or at most C/10. Combinations of charge/discharge rates in FCFD mode are also possible; for example, the electrochemical device may be charged/discharged at a rate between C/20 and 40 C, or between C/10 and 40 C.

During cycling, the electrochemical device may in some embodiments be charged to a voltage of at least 3.0 V, at least 3.2 V, at least 3.4 V, at least 3.6 V, at least 3.8 V, at least 4.0 V, at least 4.2 V, at least 4.4 V, at least 4.5 V, at least 4.6 V, or at least 4.8 V. The electrochemical device may be charged during cycling to a voltage of at most 5.0 V, at most 4.8 V, at most 4.6 V, at most 4.5 V, at most 4.4 V, at most 4.2 V, at most 4.0 V, at most 3.8 V, at most 3.6 V, at most 3.4 V, or at most 3.2 V. Combinations of charge voltages during cycling are also possible; for example, the electrochemical device may be charged to a voltage between 3.0 V and 5.0 V, or between 3.8 V and 4.6 V.

During cycling, the electrochemical device may in some embodiments be discharged to a voltage of at most 2.0 V, at most 1.9 V, at most 1.8 V, at most 1.7 V, at most 1.6 V, at most 1.5 V, at most 1.4 V, at most 1.3 V, at most 1.2 V, at most 1.1 V, at most 1.0 V, at most 0.8 V, at most 0.6 V, or at most 0.5 V. In some embodiments, the electrochemical device may be discharged during cycling to a voltage of at least 0.4 V, at least 0.5 V, at least 0.6 V, at least 0.8 V, at least 1.0 V, at least 1.1 V, at least 1.2 V, at least 1.3 V, at least 1.4 V, at least 1.5 V, at least 1.6 V, at least 1.7 V, at least 1.8 V, or at least 1.9 V. Combinations of discharge voltages during cycling are also possible; for example, the electrochemical device may first be discharged to a voltage between 2.0 V and 0.4 V, or between 1.6 V and 1.0 V.

In some embodiments, a electrochemical device comprising the P2-type layered material may be cycled between a minimum discharged voltage of 1.0 V and a maximum charged voltage of 4.5 V, wherein the electrochemical device may undergo a galvanostatic charge/discharge test at a current rate of 30 C. During the second cycle in such a test, wherein the electrochemical device is being discharged for a third time, the electrochemical device may have an initial discharge capacity of at least 100 mAh g$^{-1}$, at least 110 mAh g$^{-1}$, at least 120 mAh g$^{-1}$, at least 130 mAh g$^{-1}$, at least 140 mAh g$^{-1}$, at least 150 mAh g$^{-1}$, at least 160 mAh g$^{-1}$, at least 170 mAh g$^{-1}$, at least 180 mAh g$^{-1}$, or at least 190 mAh g$^{-1}$. The electrochemical device may have an initial discharge capacity of at most 200 mAh g$^{-1}$, at most 190 mAh g$^{-1}$, at most 180 mAh g$^{-1}$, at most 170 mAh g$^{-1}$, at most 160 mAh g$^{-1}$, at most 150 mAh g$^{-1}$, at most 140 mAh g$^{-1}$, at most 130 mAh g$^{-1}$, at most 120 mAh g$^{-1}$, or at most 110 mAh g$^{-1}$. Combinations of initial discharge capacities are also possible for cycling at 30 C; for example, the electrochemical device may have an initial discharge capacity between 100 mAh g$^{-1}$ and 200 mAh g$^{-1}$, or between 100 mAh g$^{-1}$ and 160 mAh g$^{-1}$. In some cases, the electrochemical device may have an initial discharge capacity of 130 mAh g$^{-1}$.

In some embodiments, an electrochemical device comprising the P2-type layered material may be cycled between a minimum discharged voltage of 1.0 V and a maximum charged voltage of 4.5 V, wherein the electrochemical device may undergo a galvanostatic charge/discharge test at a current rate of 10 C. During the second cycle in such a test, wherein the electrochemical device is being discharged for a third time, the electrochemical device may have an initial discharge capacity of at least 100 mAh g$^{-1}$, at least 110 mAh g$^{-1}$, at least 120 mAh g$^{-1}$, at least 130 mAh g$^{-1}$, at least 140 mAh g$^{-1}$, at least 150 mAh g$^{-1}$, at least 160 mAh g$^{-1}$, at least 170 mAh g$^{-1}$, at least 180 mAh g$^{-1}$, or at least 190 mAh g$^{-1}$. The electrochemical device may have an initial discharge capacity of at most 200 mAh g$^{-1}$, at most 190 mAh g$^{-1}$, at most 180 mAh g$^{-1}$, at most 170 mAh g$^{-1}$, at most 160 mAh g$^{-1}$, at most 150 mAh g$^{-1}$, at most 140 mAh g$^{-1}$, at most 130 mAh g$^{-1}$, at most 120 mAh g$^{-1}$, or at most 110 mAh g$^{-1}$. Combinations of initial discharge capacities are also possible for cycling at 10 C; for example, the electrochemical device may have an initial discharge capacity between 100 mAh g$^{-1}$ and 200 mAh g$^{-1}$, or between 130 mAh g$^{-1}$ and 190 mAh g$^{-1}$. In some cases, the electrochemical device may have an initial discharge capacity of 159 mAh g$^{-1}$.

In some embodiments, an electrochemical device comprising the P2-type layered material may be cycled between a minimum discharged voltage of 1.5 V and a maximum charged voltage of 4.5 V, wherein the electrochemical device may undergo a galvanostatic charge/discharge test at a current rate of 1 C. During the second cycle in such a test, wherein the electrochemical device is being discharged for a third time, the electrochemical device may have an initial discharge capacity of at least 100 mAh g$^{-1}$, at least 110 mAh g$^{-1}$, at least 120 mAh g$^{-1}$, at least 130 mAh g$^{-1}$, at least 140 mAh g$^{-1}$, at least 150 mAh g$^{-1}$, at least 160 mAh g$^{-1}$, at least 170 mAh g$^{-1}$, at least 180 mAh g$^{-1}$, or at least 190 mAh g$^{-1}$. The electrochemical device may have an initial discharge capacity of at most 200 mAh g$^{-1}$, at most 190 mAh g$^{-1}$, at most 180 mAh g$^{-1}$, at most 170 mAh g$^{-1}$, at most 160 mAh g$^{-1}$, at most 150 mAh g$^{-1}$, at most 140 mAh g$^{-1}$, at most 130 mAh g$^{-1}$, at most 120 mAh g$^{-1}$, or at most 110 mAh g$^{-1}$. Combinations of initial discharge capacities are also possible for cycling at 1 C; for example, the electrochemical device may have an initial discharge capacity between 100 mAh g$^{-1}$ and 200 mAh g$^{-1}$, or between 160 mAh g$^{-1}$ and 190 mAh g$^{-1}$. In some cases, the electrochemical device may have an initial discharge capacity of 174 mAh g$^{-1}$.

In some embodiments, an electrochemical device comprising the P2-type layered material may be cycled between a minimum discharged voltage of 1.5 V and a maximum charged voltage of 4.5 V, wherein the electrochemical device may undergo a galvanostatic charge/discharge test at a current rate of C/2. During the second cycle in such a test, wherein the electrochemical device is being discharged for a third time, the electrochemical device may have an initial discharge capacity of at least 100 mAh g$^{-1}$, at least 110 mAh g$^{-1}$, at least 120 mAh g$^{-1}$, at least 130 mAh g$^{-1}$, at least 140 mAh g$^{-1}$, at least 150 mAh g$^{-1}$, at least 160 mAh g$^{-1}$, at least 170 mAh g$^{-1}$, at least 180 mAh g$^{-1}$, or at least 190 mAh g$^{-1}$. The electrochemical device may have an initial discharge capacity of at most 200 mAh g$^{-1}$, at most 190 mAh g$^{-1}$, at most 180 mAh g$^{-1}$, at most 170 mAh g$^{-1}$, at most 160 mAh g$^{-1}$, at most 150 mAh g$^{-1}$, at most 140 mAh g$^{-1}$, at most 130 mAh g$^{-1}$, at most 120 mAh g$^{-1}$, or at most 110 mAh g$^{-1}$. Combinations of initial discharge capacities are also possible for cycling at C/2; for example, the electrochemical device may have an initial discharge capacity between 100 mAh g$^{-1}$ and 200 mAh g$^{-1}$, or between 160 mAh g$^{-1}$ and 200 mAh g$^{-1}$. In some cases, the electrochemical device may have an initial discharge capacity of 180 mAh g$^{-1}$.

In some embodiments, an electrochemical device comprising the P2-type layered material may be cycled between a minimum discharged voltage of 1.5 V and a maximum charged voltage of 4.5 V, wherein the electrochemical device may undergo a galvanostatic charge/discharge test at a current rate of C/10. During the second cycle in such a test, wherein the electrochemical device is being discharged for a third time, the electrochemical device may have an initial discharge capacity of at least 100 mAh g$^{-1}$, at least 110 mAh g$^{-1}$, at least 120 mAh g$^{-1}$, at least 130 mAh g$^{-1}$, at least 140 mAh g$^{-1}$, at least 150 mAh g$^{-1}$, at least 160 mAh g$^{-1}$, at least 170 mAh g$^{-1}$, at least 180 mAh g$^{-1}$, or at least 190 mAh g$^{-1}$. The electrochemical device may have an initial discharge capacity of at most 200 mAh g$^{-1}$, at most 190 mAh g$^{-1}$, at most 180 mAh g$^{-1}$, at most 170 mAh g$^{-1}$, at most 160 mAh g$^{-1}$, at most 150 mAh g$^{-1}$, at most 140 mAh g$^{-1}$, at most 130 mAh g$^{-1}$, at most 120 mAh g$^{-1}$, or at most 110 mAh g$^{-1}$. Combinations of initial discharge capacities are also possible for cycling at C/10; for example, the electrochemical device may have an initial discharge capacity between 100 mAh g$^{-1}$ and 200 mAh g$^{-1}$, or between 180 mAh g$^{-1}$ and 200 mAh g$^{-1}$. In some cases, the electrochemical device may have an initial discharge capacity of 198 mAh g$^{-1}$.

As a result of charging and discharging the electrochemical device, the composition of the P2-type layered material changes by sodium de-intercalation during charging and sodium intercalation during discharging. In some embodiments, as the P2-type layered material is in various states of charge and discharge, the composition of the compound $Na_X(Mn_QFe_RCo_T)O_2$ may vary such that X may have a value of at least 0, at least 0.04, at least 0.10, at least 0.14, at least 0.2, at least 0.24, at least 0.30, at least 0.35, at least 0.40, at least 0.45, at least 0.50, at least 0.55, at least 0.60, at least 0.75, at least 0.80, at least 0.85, at least 0.90, or at least 0.95. In some embodiments, X may have a value of at most 1.0, at most 0.95, at most 0.90, at most 0.85, at most 0.80, at most 0.75, at most 0.70, at most 0.65, at most 0.60, at most 0.55, at most 0.50, at most 0.45, at most 0.40, at most 0.35, at most 0.30, at most 0.24, at most 0.20, at most 0.14, at most 0.10, or at most 0.04. Combinations of these X values are also possible; for example, X may have a value greater than or equal to 0 and less than or equal to 1.0, or greater than or equal to 0.14 and less than or equal to 0.95.

U.S. Provisional Patent Application Ser. No. 62/328,659, filed Apr. 28, 2016, entitled "High Performance P2-Type Cathode Materials with Superior Rate Capability for Na-Ion Batteries" is hereby incorporated by reference in its entirety.

The following examples are intended to illustrate certain embodiments of the present invention, but do not exemplify the full scope of the invention.

Example 1

This example illustrates the synthesis and characterization of a P2-type layered material with the chemical composition $Na_n(Mn_{1/2}Fe_{1/4}Co_{1/4})O_2$.

$P2\text{-}Na_{2/3}(Mn_{1/2}Fe_{1/4}Co_{1/4})O_2$ was synthesized by a solid state reaction. 1.7665 g of sodium carbonate ($Na_2CO_3$, Alfa Aesar, 99.95%-100.05%), 1.993 g of manganese (III) oxide ($Mn_2O_3$, Aldrich, 99%), 0.999 g of iron (III) oxide ($Fe_2O_3$, Alfa Aesar, 99.99%), and 1.006 g of cobalt (II, III) oxide ($CO_3O_4$, Alfa Aesar, 99.7%) were each weighed out using a Mettler Toledo XS105DU analytical balance and then mixed together, and the mixture was ground by high-energy ball milling using a Retsch Ball Mill PM 200. The ground mixture was then pressed into pellets. The pellets were then calcined in a Thermo Scientific Lindberg BF51732C Blue M Box Furnace (programmable, without OTC, 208V) with an internal volume of 17 L in an air atmosphere, by increasing the temperature of the mixture at a rate of 5 (five) degrees Celsius per minute to 900 (nine hundred) degrees Celsius and then maintaining the temperature at 900 degrees Celsius for 12 (twelve) hours. An air atmosphere was used for the synthesis to provide an appropriately balanced oxidizing environment; Ar, $N_2$ or $O_2$ were either too reducing or too oxidizing. The pellets were then quenched to room temperature by contacting the pellets with a copper foil for 20 seconds. The quenched pellets were then immediately transferred to an Argon-filled glove box in order to minimize air contact with the product pellets.

In order to determine the chemical composition of the product, the crystallographic structure of the product, and/or phase(s) present in the product, the samples were analyzed by X-ray powder diffraction (XRD). The instrument used for XRD was a PANalytical X'Pert Pro multipurpose powder diffractometer equipped with Cu K-alpha radiation (wavelength=1.541 Angstroms). All samples were well-sealed with a Kapton polymer thin film to prevent air exposure during the analysis.

The XRD pattern in FIG. 1 was analyzed using Rietveld refinement, as shown in FIG. 1, 100, with the Rietveld refinement results directly superimposed over the raw observed XRD pattern. The XRD pattern in FIG. 1 was well-refined (e.g., with minor differences between the calculated pattern and the observed pattern) with the hexagonal space group $P6_3$/mmc without any diffraction peaks from impurities. It was determined from the Rietveld refinement that the product $P2\text{-}Na_{2/3}(Mn_{1/2}Fe_{1/4}CO_{1/4})O_2$ was synthesized with the hexagonal space group $P6_3$/mmc (as indicated by the tick marks in FIG. 1, 110) without any impurities present. These conclusions were drawn due to only minor differences between the calculated pattern and the observed XRD pattern (with the differences between calculated and observed shown by FIG. 1, 120; the corresponding difference metric $R_{wp}$=1.046% as in FIG. 4, with a considered good fit having an $R_{wp}$ of 10% or less) and the lack of diffraction peaks from impurities (FIG. 1, 100). The refined structure is shown by FIG. 1, 130. FIG. 1, 140 is a scanning electron microscopy (SEM) image of as-prepared $Na_{2/3}(Mn_{1/2}Fe_{1/4}CO_{1/4})O_2$. The SEM image was obtained on a Zeiss Merlin high-resolution scanning electron microscope. The SEM image in FIG. 1, 140 shows primary particles with a plate-like shape and a hexagonal layered morphology, reflecting the material's crystallographic hexagonal symmetry, with an average plate diameter of between 2 and 5 microns.

The XRD crystallographic structural parameters of the synthesized $P2\text{-}Na_{2/3}(Mn_{1/2}Fe_{1/4}Co_{1/4})O_2$ material are tabulated in FIG. 4 and FIG. 5, and selected bond lengths of the synthesized $P2\text{-}Na_{2/3}(Mn_{1/2}Fe_{1/4}Co_{1/4})O_2$ material are tabulated in FIG. 6.

Figure 7:
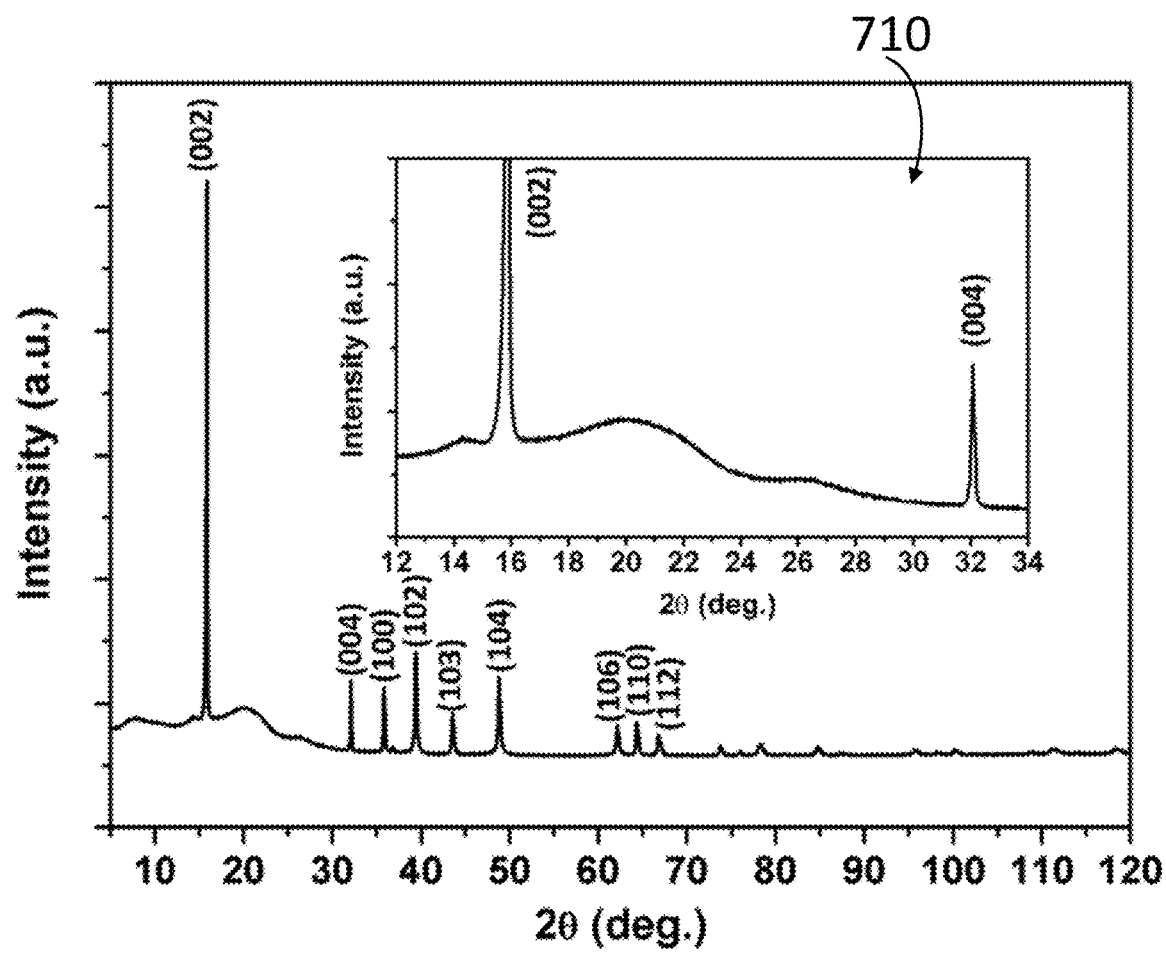
FIG. 7 illustrates an experimental XRD pattern of P2-$Na_{2/3}(Mn_{1/2}Fe_{1/4}Co_{1/4})O_2$, and a closer view of a subset of the pattern (FIG. 7, 710), in accordance with one embodiment of the invention as in FIG. 1.

FIG. 7 shows an XRD pattern of $P2\text{-}Na_{2/3}(Mn_{1/2}Fe_{1/4}Co_{1/4})O_2$ that shows data for 2-theta greater than or equal to 5 (vs. 2-theta greater than or equal to 30 for FIG. 1). As shown in FIG. 7, no superstructure peaks were observed in the XRD pattern in the region between the 002 and 004 peaks (FIG. 7, 710), indicating the absence of long-range ordering of either Na or transition metals. By contrast, long-range ordering has often been reported in other layered compounds. The broad humps present in the XRD pattern in FIG. 7 are from the Kapton polymer thin film sealing the sample to prevent air exposure.

Thus, this example illustrates that a P2-type layered material with the chemical formula $Na_{2/3}(Mn_{1/2}Fe_{1/4}Co_{1/4})O_2$ was synthesized by solid state synthesis, from sodium carbonate and transition metal oxide reactants. As shown in this example, the $P2\text{-}Na_{2/3}(Mn_{1/2}Fe_{1/4}Co_{1/4})O_2$ was found by XRD to be free of impurities and to have a hexagonal crystal structure with the space group $P6_3$/mmc without long-range ordering of sodium or any transition metal.

Example 2

This example illustrates the rate performance of batteries comprising P2-MFC, for example, in battery cells comprising a first electrode comprising a high power P2-type layered material with the chemical formula $Na_x(Mn_{1/2}Fe_{1/4}Co_{1/4})O_2$, where x has a value between 0 and 1 depending on the state of charge/discharge of the battery, and the electrochemical performance of battery cells comprising the electrode material as evaluated by galvanostatic charge/discharge testing. P2-MFC herein refers to $Na_x(Mn_{1/2}Fe_{1/4}Co_{1/4})O_2$, where x has a value between 0 and 1, as the synthesized material $Na_{2/3}(Mn_{1/2}Fe_{1/4}Co_{1/4})O_2$ underwent charging and discharging.

The $P2\text{-}Na_{2/3}(Mn_{1/2}Fe_{1/4}Co_{1/4})O_2$ active material from Example 1 was used as the cathode in assembled batteries. First electrodes consisted of 80 wt % of active material, 15 wt % of carbon black and 5 wt % of PTFE as a binder. Sodium metal was used as second electrodes. 1M $NaPF_6$ dissolved in a mixture of ethylene carbonate/diethyl carbonate (EC/DEC) (1:1 v/v) was used as the electrolyte, and a glass fiber filter having grade GF/D (Whatman) was used as the separator. Swagelok-type cells were assembled in an Ar-filled glovebox.

Figure 8:
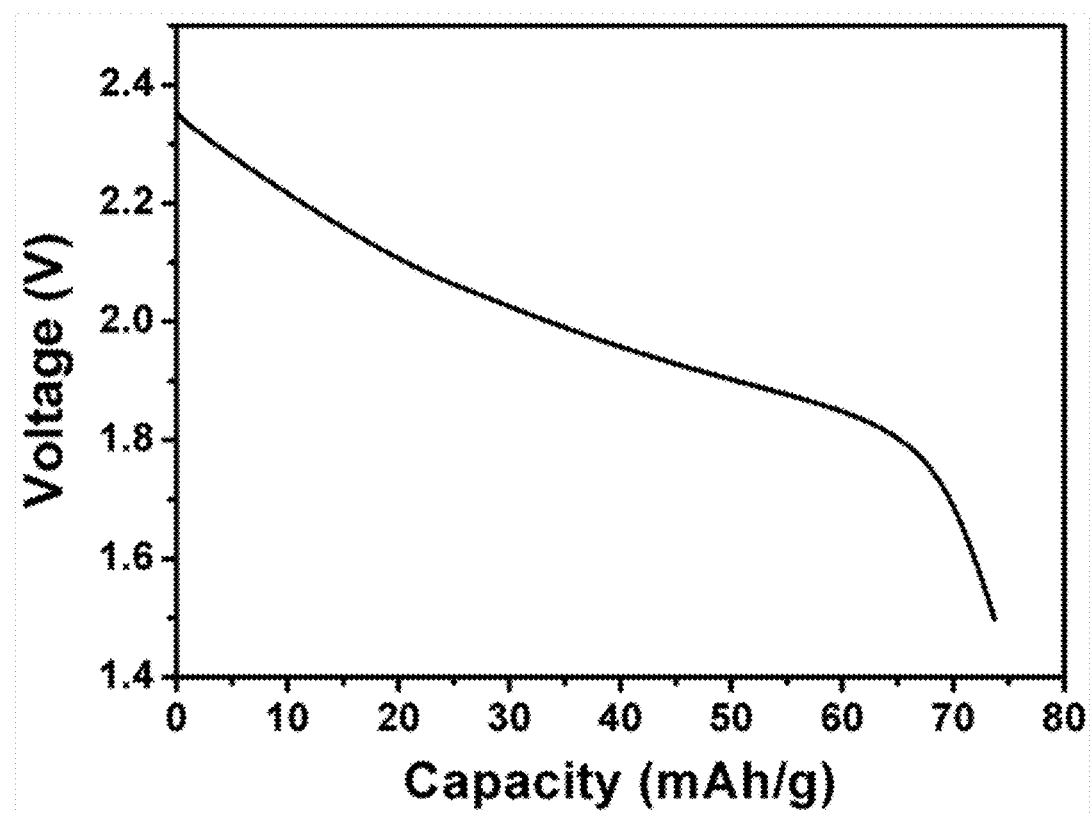
FIG. 8 illustrates a representative initial galvanostatic discharge curve for a battery comprising P2-MFC, in accordance with another embodiment of the invention.

These battery cells comprising the cathode were electrochemically evaluated at different cutoff voltages and current rates. The cells were tested on a Solatron battery cycler. All the electrochemical tests were carried out after an initial galvanostatic discharge from open circuit voltage (OCV) to 1.5 V at a rate of 0.1 C with a typical initial galvanostatic discharge curve shown in FIG. 8. This discharge was carried out before the formal electrochemical (EC) test.

Figure 2A:
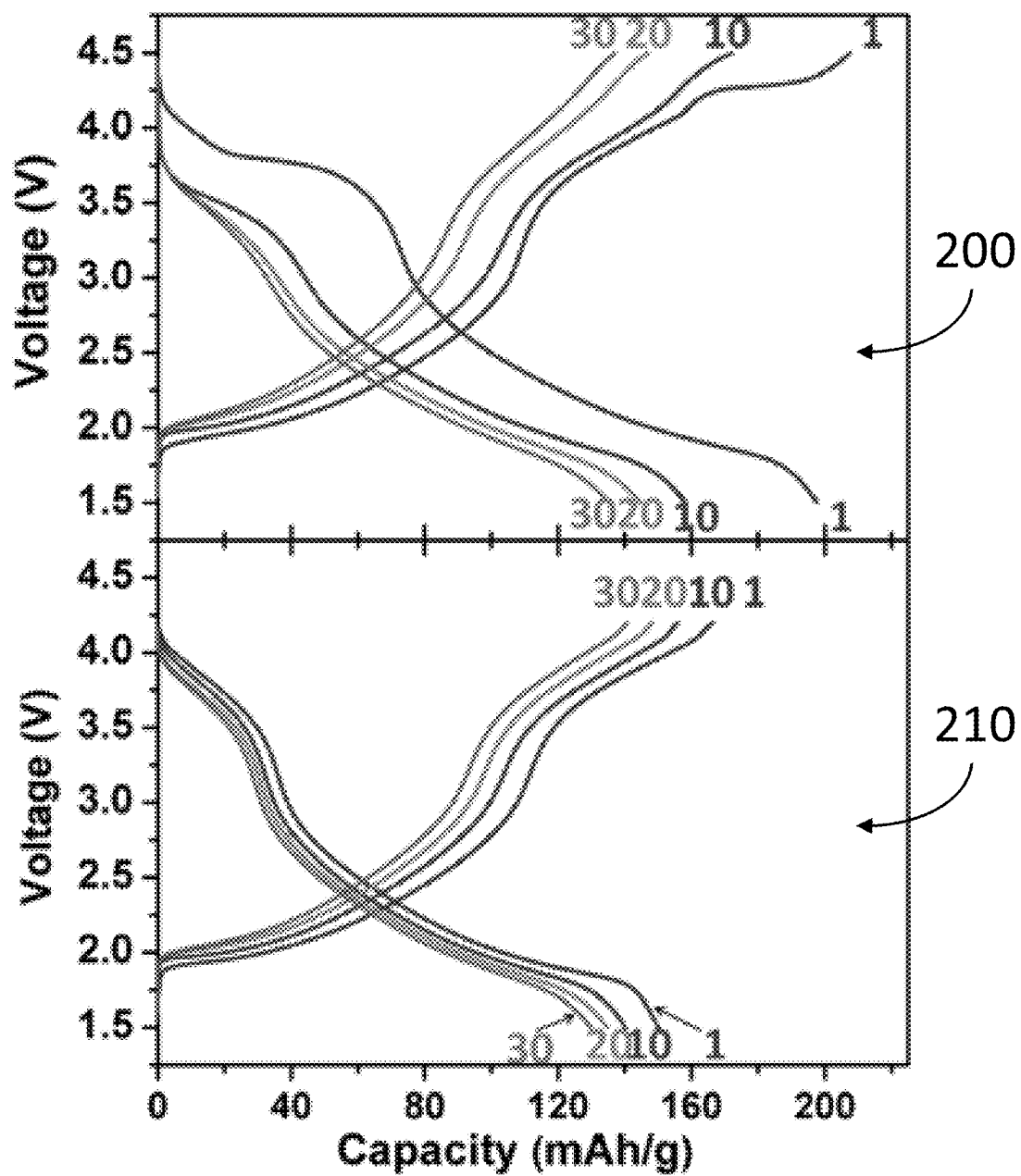
FIG. 2A illustrates the first, tenth, twentieth, and thirtieth galvanostatic charge/discharge cycle curves for a battery comprising P2-MFC, which is a P2-type layered material with the chemical formula $Na_x(Mn_{1/2}Fe_{1/4}Co_{1/4})O_2$ where x has a value between 0 and 1, in another embodiment of the invention.
Figure 2B:
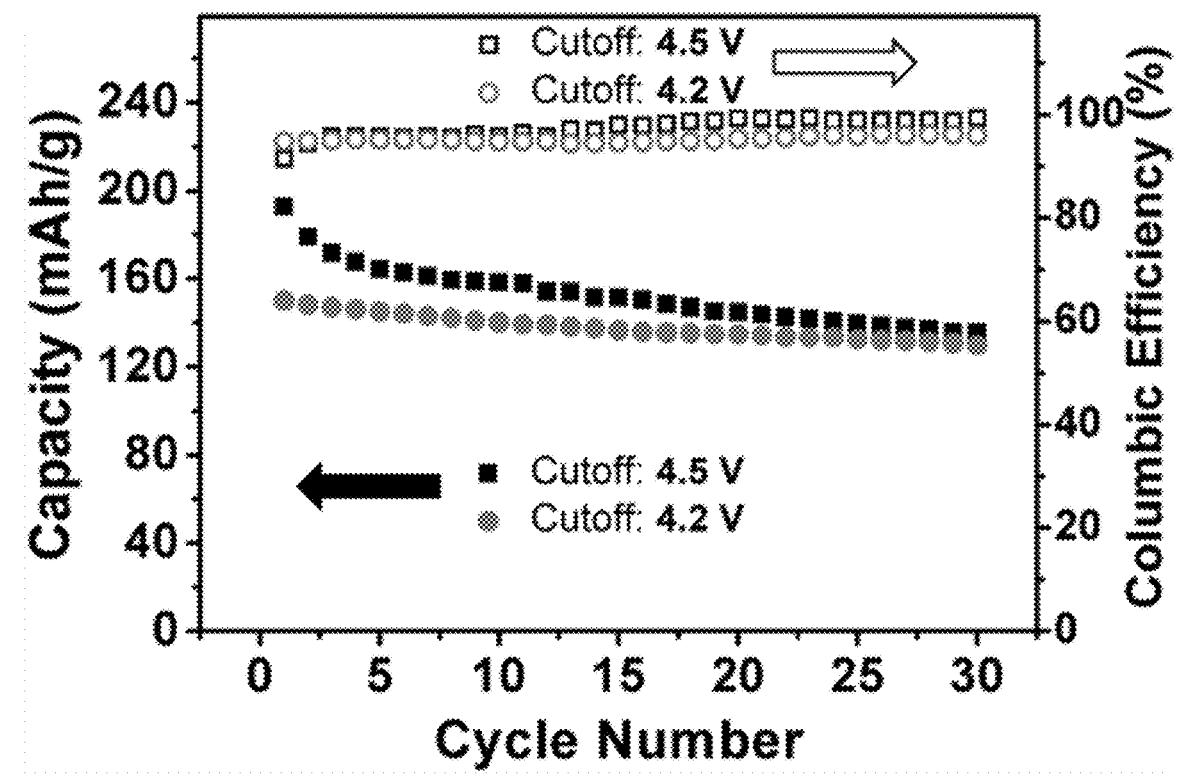
FIG. 2B illustrates the cyclability of a battery comprising P2-MFC, in yet another embodiment of the invention.

FIG. 2A illustrates the first, tenth, twentieth, and thirtieth galvanostatic charge/discharge cycle curves for a battery comprising P2-MFC, at a current rate of C/10 in the voltage ranges of from 1.5 V to 4.5 V (FIG. 2A, 200) and from 1.5 V to 4.2 V (FIG. 2A, 210) versus $Na^+$/Na after initially discharging to 1.5 V. A battery comprising P2-MFC showed a large initial discharge capacity of 195 mAh/g when cycled between 1.5 V and 4.5 V as shown in FIG. 2A, 200. The high voltage plateau above 4.25 V disappeared upon cycling and could hardly be observed after 10 cycles. When the cutoff voltage was lowered to 4.2 V (FIG. 2A, 210), the 4.25 V plateau was avoided and the cyclability was noticeably improved with an initial discharge capacity at 150 mAh/g. The difference in cyclability at different cutoff voltages is clearly demonstrated in FIG. 2B.

Figure 2C:
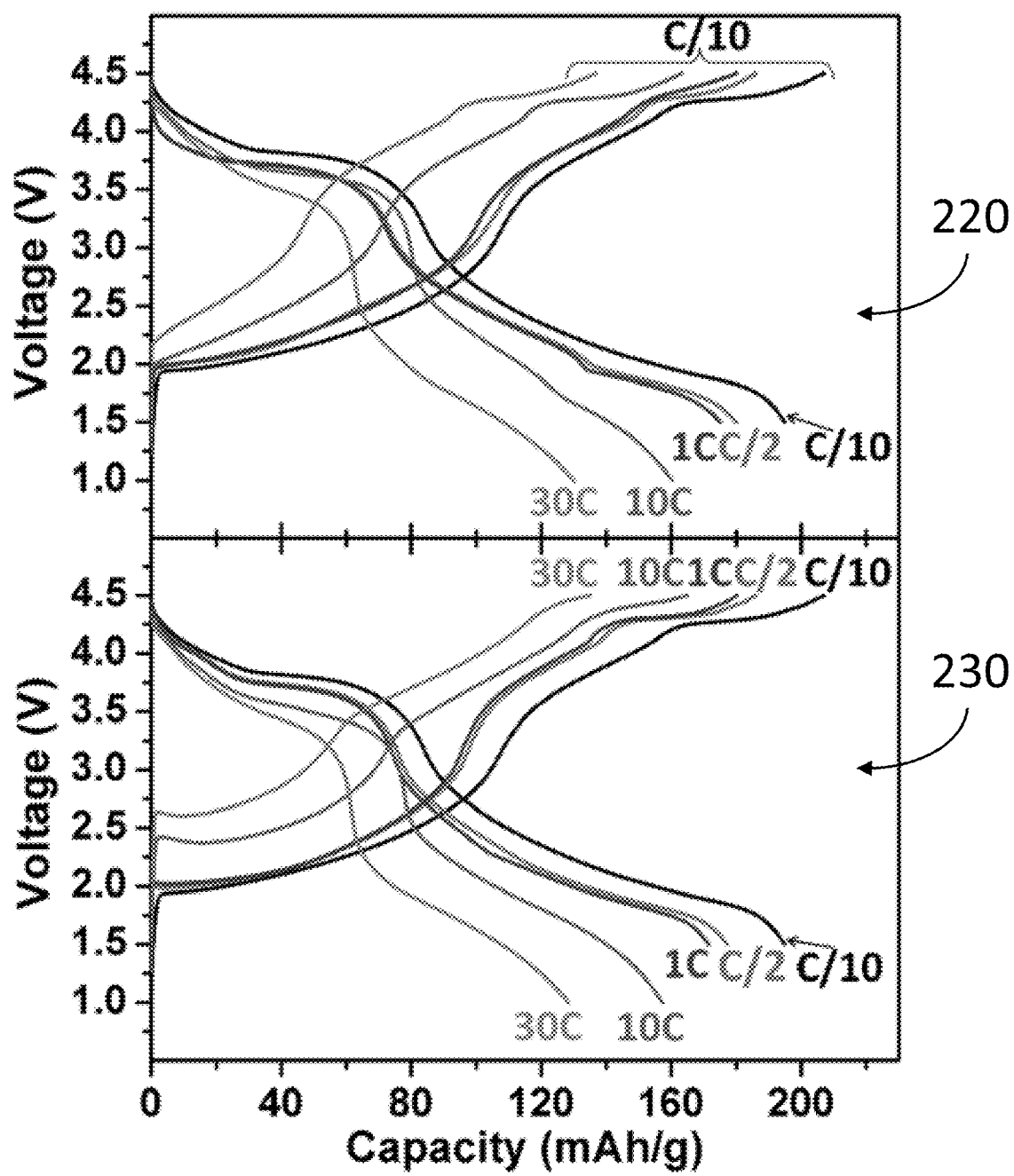
FIG. 2C illustrates the rate performance of a battery comprising P2-MFC as tested in slow charge fast discharge (SCFD) mode (FIG. 2C, 220) and fast charge fast discharge (FCFD) mode (FIG. 2C, 230), in accordance with another embodiment of the invention.

The rate performance of P2-MFC was tested in two different modes: a slow charge followed by a fast discharge (SCFD) shown in FIG. 2C, 220, and a fast charge followed by a fast discharge (FCFD) shown in FIG. 2C, 230. FIG. 2C illustrates the rate capability of a battery comprising P2-MFC as evaluated by galvanostatic charge/discharge curves in the first cycle, obtained in the voltage range from 1.5 V to 4.5 V in (FIG. 2C, 220) SCFD mode (slow charge and fast discharge, applying a charge current rate of C/10 and discharge current rate of from C/10 to 30 C) and (FIG. 2C, 230) FCFD mode (fast charge and fast discharge, applying the same charge and discharge current rate of from C/10 to 30 C). The charge curves in SCFD mode were all obtained at a current rate of C/10. The major effect of increasing the discharge rate was on the length and the height of low voltage plateau. In FCFD mode, polarization increased both on the low voltage plateau and the 4.25 V plateau, which shortened in charge as the rate increased to 10 C and 30 C. Discharge curves/capacities in SCFD and FCFD modes were similar, indicating that the rate limitation may have been more pronounced in charge.

Figure 17:
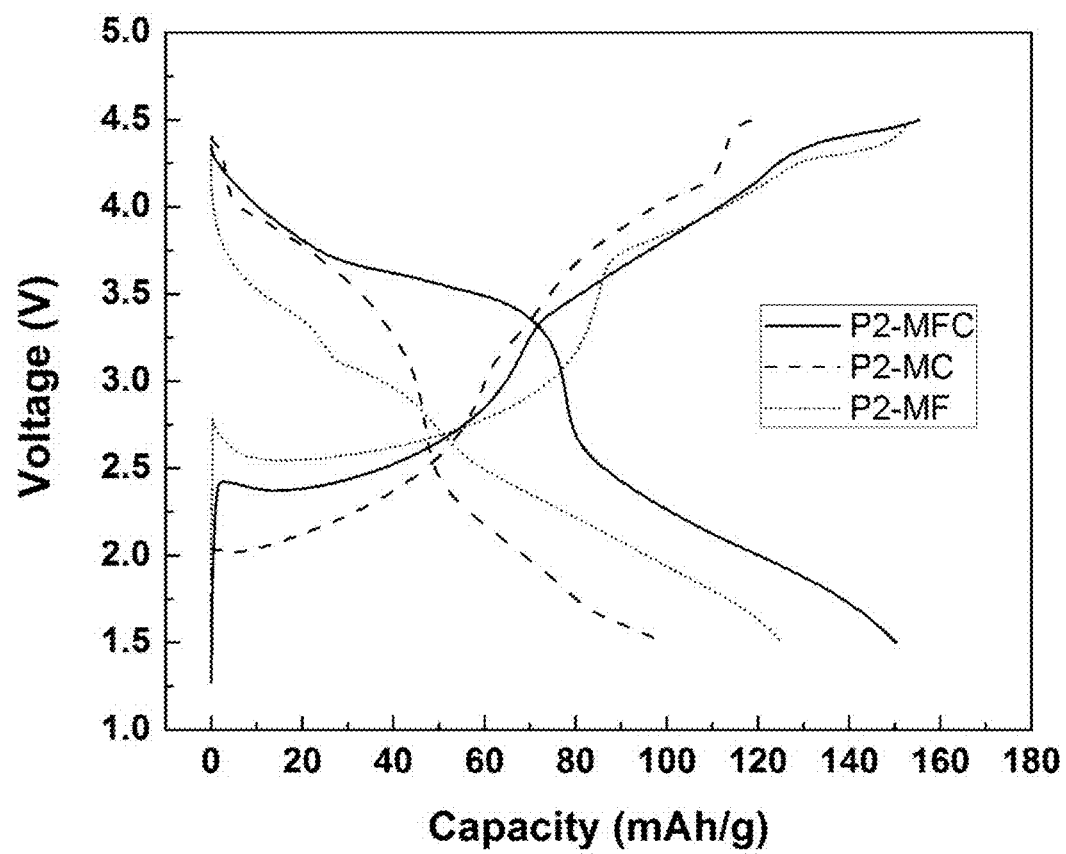
FIG. 17 illustrates initial charge/discharge curves in FCFD mode for a first battery comprising P2-MFC, a second battery comprising P2-$Na_{2/3}Mn_{1/2}CO_{1/2}O_2$ (P2-MC), and a third battery comprising P2-$Na_{2/3}Mn_{1/2}Fe_{1/2}O_2$(P2-MF), in accordance with another embodiment of the invention.

FIG. 17 illustrates initial charge/discharge curves for a first battery comprising P2-$Na_{2/3}Mn_{1/2}Fe_{1/4}Co_{1/4}O_2$ (P2-MFC), a second battery comprising P2-$Na_{2/3}Mn_{1/2}CO_{1/2}O_2$ (P2-MC), and a third battery comprising P2-$Na_{2/3}Mn_{1/2}Fe_{1/2}O_2$ (P2-MF). Each battery was a coin cell battery. Each battery was charged/discharged at a current density of 10 C, in the voltage window from about 1.5V to about 4.5V. Each battery comprised a 1M $NaPF_6$ electrolyte. P2-MF showed a jump at the beginning of the charge (FIG. 17), indicating poor $Na^+$ diffusivity in the low-voltage region, which was consistent with the findings in Example 3, FIG. 2D. The P2-P'2 phase transition in P2-MF, i.e. the monoclinic distortion caused by $Mn^{3+}$, was an obstacle to the $Na^+$ diffusion. P2-MC had low over-potential (FIG. 17), but the capacity was limited as $Co^{3+}$ could not be fully oxidized to $Co^{4+}$ at the end of charge. In P2-MFC, $Co^{3+}$ was reduced to $Co^{2+}$ upon discharge, which allowed the $Mn^{4+}$ oxidation state to be maintained and avoided the P-P'2 phase transition. The amount of Co in the composition was also limited so that it did not jeopardize the capacity.

Figure 2D:
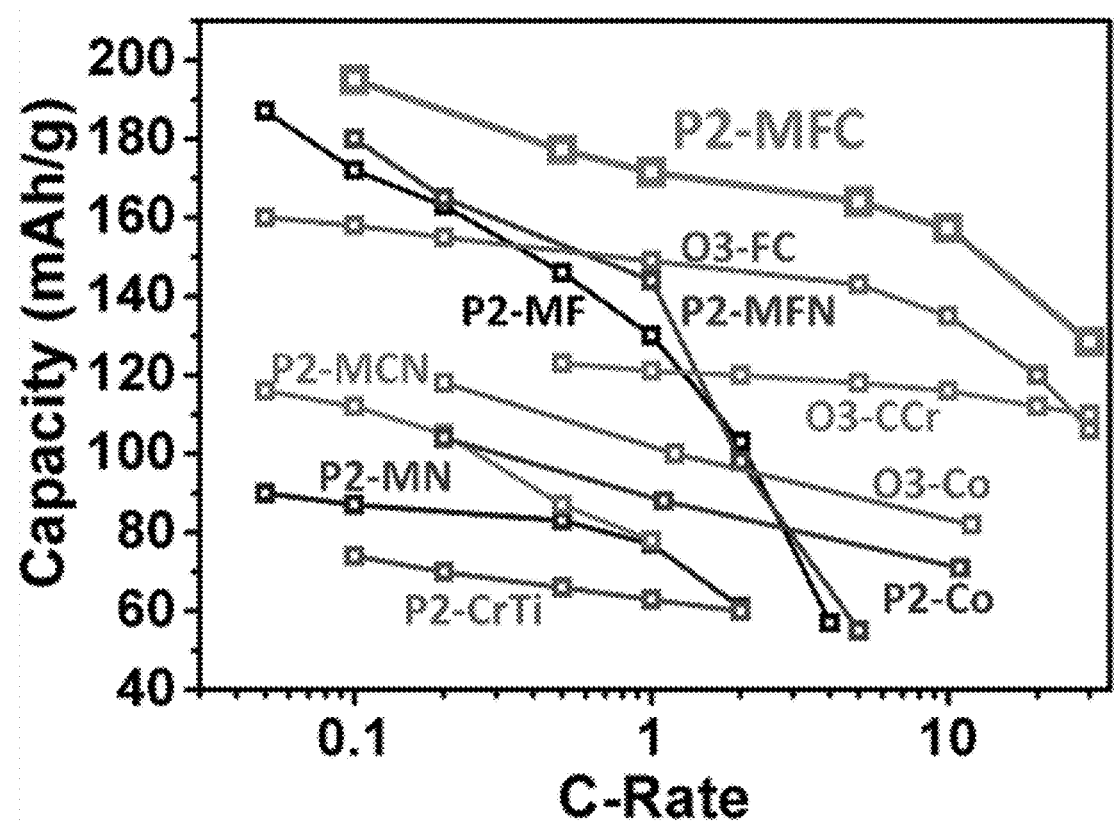
FIG. 2D illustrates a comparison of the rate capability of a battery comprising P2-MFC to the performance of batteries comprising other layered materials, in still another embodiment of the invention.

Even at 30 C rate a discharge capacity of 130 mAh/g was maintained, which was the highest rate performance among Na ion intercalation compounds. Discharge capacities of 128 mAh/g and 130 mAh/g were obtained at 30 C rate in SCFD and FCFD mode respectively, which were much larger than any previously reported layered oxide as shown in FIG. 2D. FIG. 2D illustrates discharge capacities of a battery comprising P2-MFC in the second cycle in FCFD mode for a sample loading of cathode between 1.8 mg/cm$^2$ and 2.2 mg/cm$^2$ (1 C=258 mA/g), and discharge capacities for batteries comprising other reported layered materials: $NaFe_{1/2}CO_{1/2}O_2$ (O3-FC), $Na_{2/3}Mn_{1/2}Fe_{1/2}O_2$ (P2-MF), $Na_{0.5}(Ni_{0.23}Fe_{0.13}Mn_{0.63})O_2$ (P2-MFN), carbon-coated $NaCrO_2$ (O3-CCr), $NaCoO_2$ (O3-Co), $Na_{2/3}CoO_2$ (P2-Co), $Na_{0.67}(Mn_{0.65}CO_{0.2}Ni_{0.15})O_2$ (P2-MCN), and $Na_{2/3}Ni_{1/3}Mn_{2/3}O_2$ (P2-MN). The rate performance of P2-MFC was outstanding among layered oxide materials, in particular considering that it was achieved with an average particle size above 1 micron without any further optimization.

Thus, this example illustrates that batteries comprising P2-MFC had good cyclability and superior rate performance relative to alternative P2-type layered materials. P2-MFC showed the highest rate performance among P2-type layered materials. These result suggest that P2-MFC is a promising electrode candidate for applications in high power batteries.

Example 3

This example illustrates the structural changes underwent by P2-MFC while acting as the cathode of a battery during the charge/discharge process under galvanostatic conditions.

P2-$Na_{2/3}(Mn_{1/2}Fe_{1/4}Co_{1/4})O_2$ was prepared as in Example 1 and studied as a cathode material for Na-ion batteries in Example 2, in an attempt to suppress most of the first-order phase transitions that occur during de-sodiation (i.e. charging, i.e. sodium de-intercalation) for other P2-type layered materials.

Figure 9:
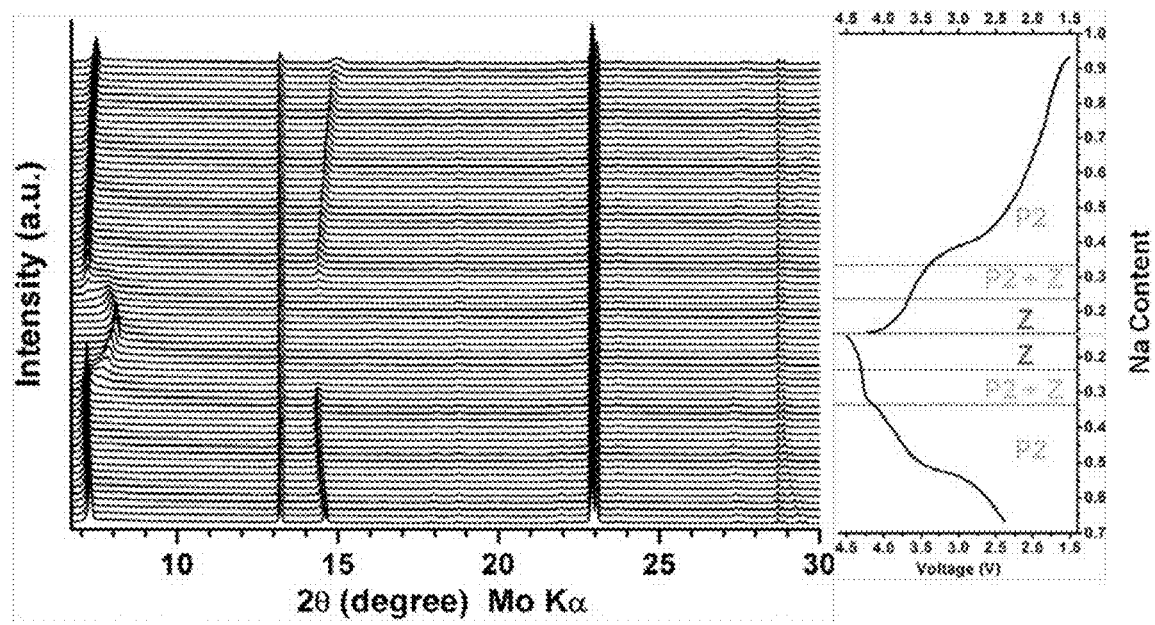
FIG. 9 illustrates in situ XRD patterns of P2-MFC corresponding to the abbreviated patterns in FIG. 3A (FIG. 9, left-hand side) and corresponding galvanostatic charge/discharge curves for a battery comprising P2-MFC (FIG. 9, right-hand side), in still another embodiment of the invention.

The structure evolution of P2-MFC during $Na^+$ intercalation/de-intercalation was investigated with in situ XRD as shown in FIG. 9. FIG. 9 plots in situ XRD patterns of P2-MFC at a range of from 6.5 degrees to 30.5 degrees (Mo source) corresponding to the abbreviated patterns in FIG. 3A (FIG. 9, left-hand side) and galvanostatic charge/discharge curves obtained at a current rate of C/50 (FIG. 9, right-hand side).

The in situ cell consisted of same components as the Swagelok-type cells from Example 2 but with a modified design to enable collection of XRD signals through a Be window. XRD patterns were continuously collected in a repeated manner on a Bruker D8 X-ray diffractometer equipped with a Mo source while the in situ cell was charged/discharged between 1.5 V and 4.5 V at a rate of C/50. Each scan was carried out in the 2-theta range of from 6.5 degrees to 30.5 degrees at a scan rate of 0.0067 degrees per second.

Figure 3A:
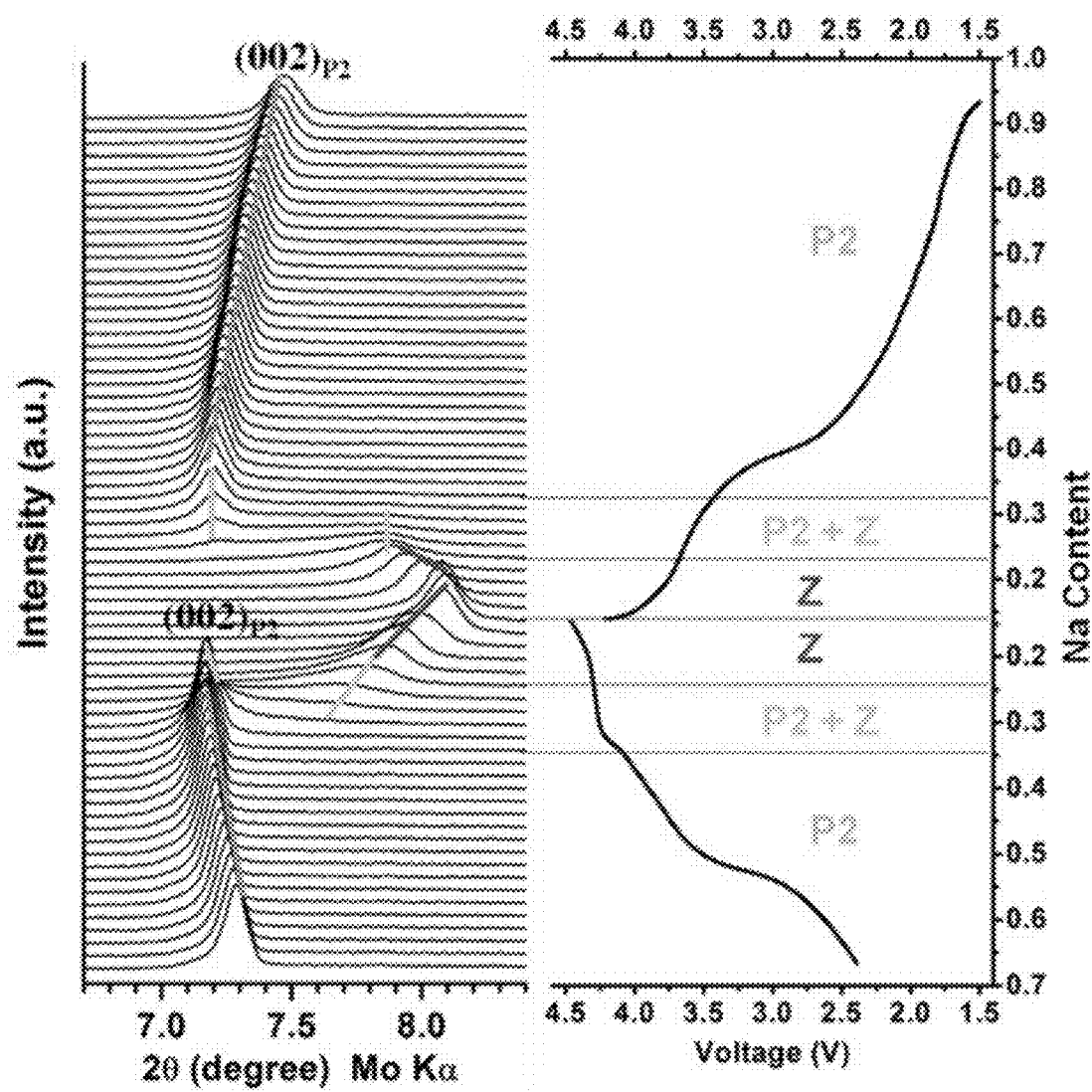
FIG. 3A illustrates abbreviated in situ XRD patterns for P2-MFC (left-hand side) and corresponding galvanostatic charge/discharge curves for a battery comprising P2-MFC (right-hand side), in yet another embodiment of the invention.
Figure 3B:
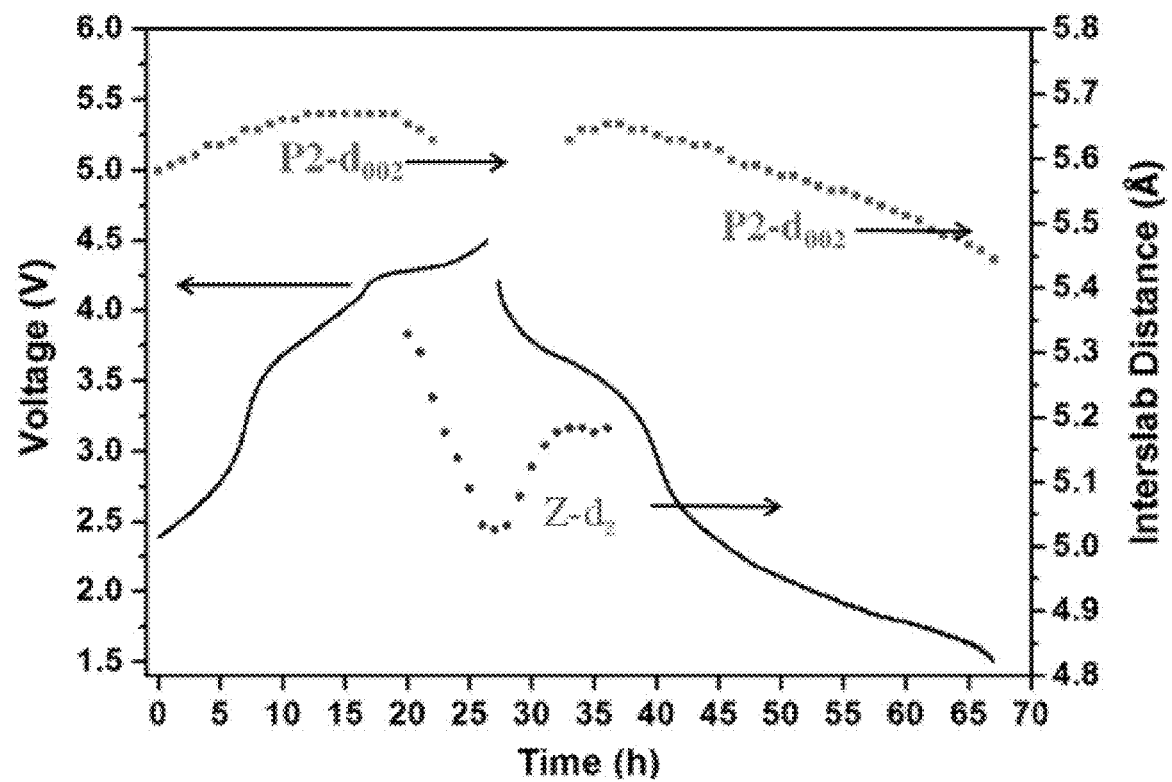
FIG. 3B demonstrates changes in inter-slab distances in P2-MFC during the electrochemical charge/discharge process, in accordance with another embodiment of the invention.

FIG. 3A shows the evolution of the characteristic 002 peak and FIG. 3B shows the evolution of the corresponding inter-slab distances during the initial charge/discharge process, as determined from the in situ XRD. FIG. 3A illustrates XRD patterns which were taken at 1 hour scanning rate per pattern (Each pattern was taken at a range of from 6.5 degrees to 30.5 degrees, Mo K-alpha, as shown in FIG. 9. Only the region around the 002 peak is shown here) (FIG. 3A, left-hand side) and galvanostatic charge/discharge curves obtained at a current rate of C/50 (FIG. 3A, right-hand side). FIG. 3B demonstrates the evolution of inter-slab distances in $Na_x(Mn_{1/2}Fe_{1/4}Co_{1/4})O_2$, wherein x has a value between 0 and 1, during the electrochemical sodiation/desodiation process (i.e. charge/discharge process).

Figure 10:
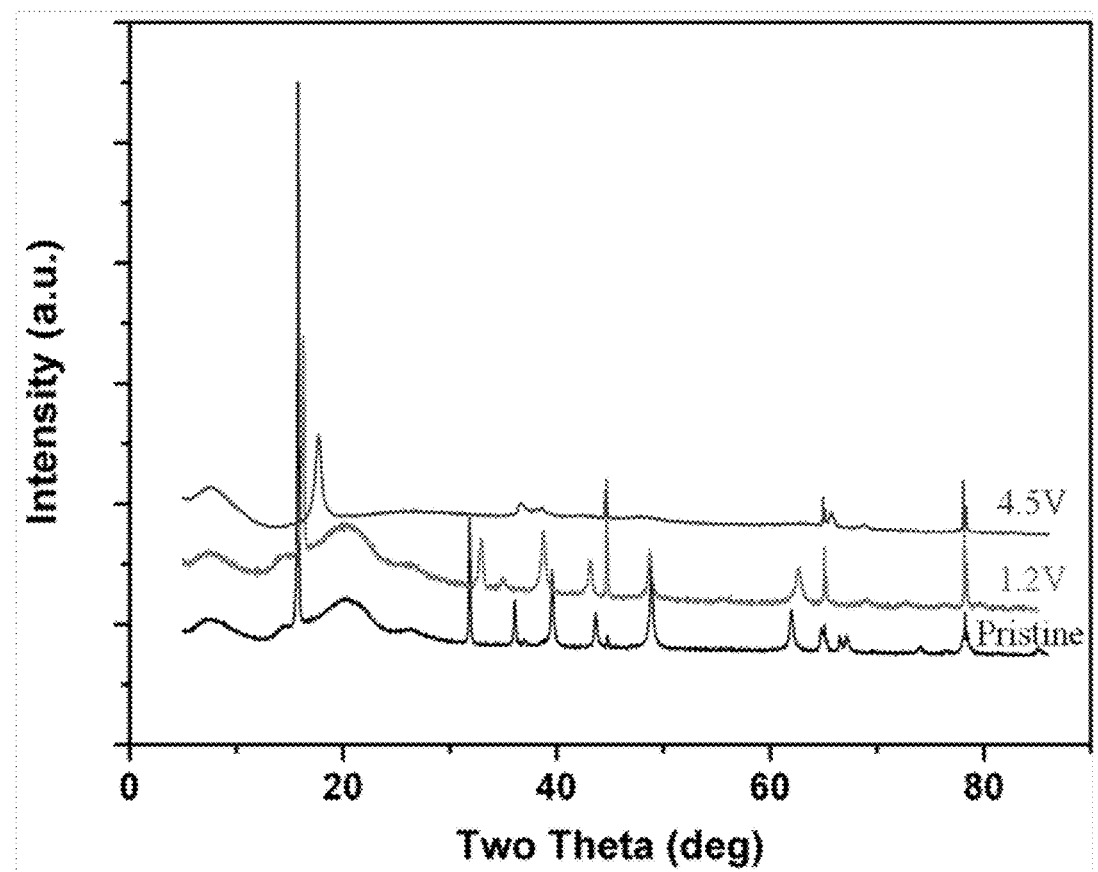
FIG. 10 illustrates ex situ XRD patterns for P2-MFC pristine, discharged to 1.2 V, and charged to 4.5 V, in certain embodiments of the invention.

In contrast to the complicated phase transitions often observed in O3-type layered compounds, P2-MFC retained the P2 phase over a wide range of Na content. P2-type stacking was observed for a wide range of Na content (0.34<x<0.95) with short-range ordering of Na ions observed for x values of 0.65 and approx. 1. As shown in FIG. 3A, during the charge process, the P2 phase was retained down to 34% Na intercalation (i.e. 0.34 Na content) at which point a new phase, herein after referred to as "Z", started to form through a two-phase reaction between 34% Na intercalation and 25% Na intercalation. The Z phase occurred as a single phase between 25% Na intercalation and 14% Na intercalation. The structure of the high-voltage phase (Z) was not able to be characterized, since the peaks in the ex situ XRD pattern obtained at 4.5 V were highly broadened as shown in FIG. 10. FIG. 10 shows a comparison of the ex situ XRD patterns of $Na_x(Mn_{1/2}Fe_{1/4}Co_{1/4})O_2$ electrodes in charged/discharged states, for an x value between 0 and 1. The electrodes were prepared with the methods described in Example 1. These XRD patterns in FIG. 10 were obtained for the pristine electrode, the electrode used in a battery that was charged to 4.5V and maintained at 4.5V for 24 h, and the electrode used in a battery that was discharged to 1.2V and maintained at 1.2V for 24 h.

Upon discharge, the Z phase transformed back to the single P2 phase which was then present for the rest of the discharge, corresponding to approximately 95% Na intercalation. No P'2 phase with monoclinic distortion was observed in P2-MFC when discharged to 1.5 V, which was distinct from P2-MF (rate performances compared in FIG. 2D).

Figure 3C:
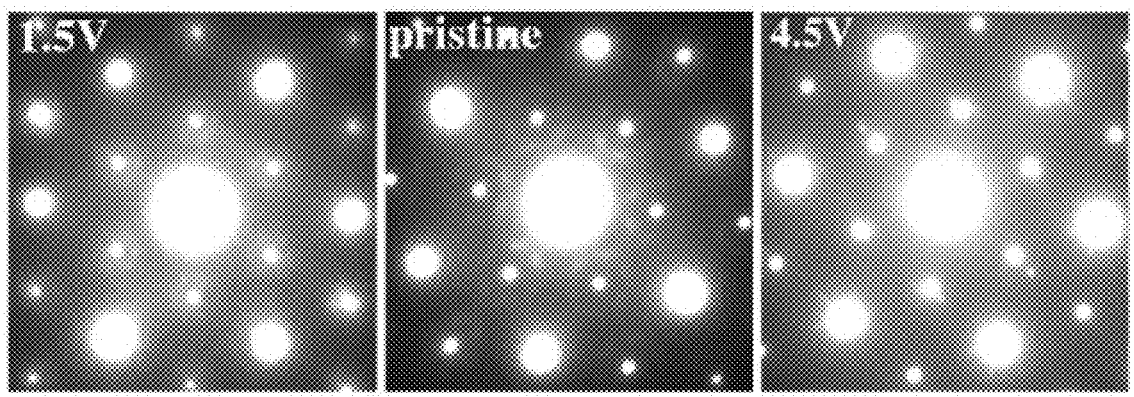
FIG. 3C illustrates electron diffraction patterns for P2-MFC discharged to 1.5 V (left), pristine (center), and charged to 4.5 V (right), in certain embodiments of the invention.

FIG. 3C illustrates the structure evolution of $Na_x(Mn_{1/2}Fe_{1/2}CO_{1/4})O_2$ during the initial charge/discharge process by selected area electron diffraction (SAED) patterns obtained on a JEOL 2010F transmission electron microscope. FIG. 3C shows electron diffraction patterns which were taken along the [002] zone axis, perpendicular to the ab TM slab, for three samples: one discharged to 1.5 V, $Na_{0.95}(Mn_{1/2}Fe_{1/4}CO_{1/4})O_2$ (FIG. 3C left; approx. 94% Na intercalation); one pristine, $Na_{2/3}(Mn_{1/2}Fe_{1/4}Co_{1/4})O_2$ (FIG. 3C center; approx. 67% Na intercalation); and one charged to 4.5 V, $Na_{0.14}(Mn_{1/2}Fe_{1/4}Co_{1/4})O_2$ (FIG. 3C right; approx. 14% Na intercalation), respectively. One unique feature observed by electron diffraction was the different diffuse scattering patterns observed in the 1.5 V and pristine samples with P2 structure, which indicated the evolution of Na ion short range ordering (SRO) in the Na layer upon intercalation.

Thus, this example illustrates that for the majority of the charge/discharge process, there was no phase change away from the P2 phase in P2-MFC, with a phase change having been initiated only at approx. 34% Na intercalation during charging. In particular, at the end of discharge there was no monoclinic distortion observed by in situ XRD. A monoclinic transition at the end of discharge has by contrast been observed in other Mn-containing P2-type layered materials; this transition was successfully suppressed in P2-MFC. This judicious suppression of phase transitions in P2-MFC was at least in part responsible for the excellent rate performance of this material, and the methods employed here could be extended to other materials.

Example 4

This example illustrates support for the mechanism of enhanced rate performance for P2-MFC relative to other P2-type layered materials, including XRD results and electron energy loss spectroscopy (EELS).

Several factors were hypothesized to be responsible for the good rate performance of P2-MFC shown in Example 2, consistent with the strategy of suppressing phase transitions by introducing transition metal disorder. Indeed, from the in situ XRD results (FIG. 3A), a major solid solution was observed for a large range of Na content (from 0.34 to 0.95) in the P2 phase without any phase transition or long-range Na ordering which was further verified by the P2 structures in the ex situ XRD patterns in FIG. 13.

Figure 13:
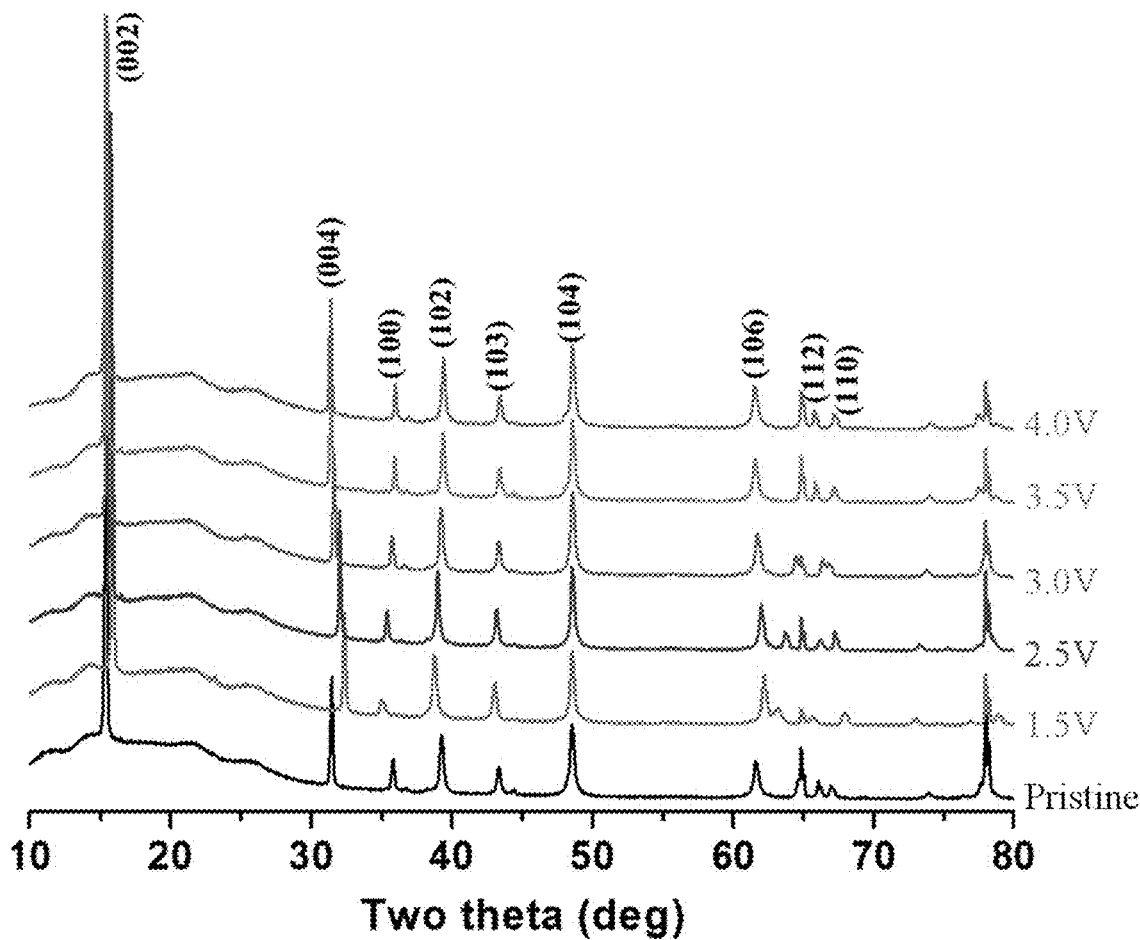
FIG. 13 illustrates ex situ XRD patterns of P2-MFC in different charge/discharge states, in accordance with some embodiments of the invention.

FIG. 13 illustrates a comparison of the ex situ XRD patterns of $P2-Na_x(Mn_{1/2}Fe_{1/4}Co_{1/4})O_2$ in different charge/discharge states, for values of x between 0 and 1. The pristine pattern was obtained on the pristine $P2-Na_{2/3}(Mn_{1/2}Fe_{1/4}CO_{1/4})O_2$ powder as synthesized. Electrodes containing the pristine $P2-Na_{2/3}(Mn_{1/2}Fe_{1/4}CO_{1/4})O_2$ powder were prepared in battery cells and charged/discharged using the methods described in Example 2 to obtain the other XRD patterns. The 1.5 V XRD pattern was obtained on electrodes initially discharged to 1.5 V while the 2.5 V, 3.0 V, 3.5 V and 4.0 V XRD patterns were obtained on electrodes initially discharged to 1.5 V and then correspondingly charged to 2.5 V, 3.0 V, 3.5 V and 4.0 V.

Mixing the transition metals Mn, Fe, and Co in the layered material was an effective way to perturb the ordering of the transition metal sublattice and prevent sodium ions from ordering. The random field the disordered transition metals exerted on the Na sites created perturbations of the Na-site energy, making ordering much more difficult.

Furthermore, in the low-voltage region, no P'2 phase was observed even at Na=0.95, which was distinct from the monoclinic distortion observed for example in $P2-Na_xMn_{0.5}Fe_{0.5}O_2$ (P2-MF). Both P2-MFC and P2-MF had 50% Mn content. If all Mn in P2-MFC were reduced to $Mn^{3+}$ in the fully discharged state, that would have caused a monoclinic distortion due to the strong collective Jahn-Teller effect of $Mn^{3+}$, as observed in the P2-MF. The absence of a monoclinic distortion at the end of discharge in P2-MFC might have been related to the presence of 25% Co ions.

Figure 11:
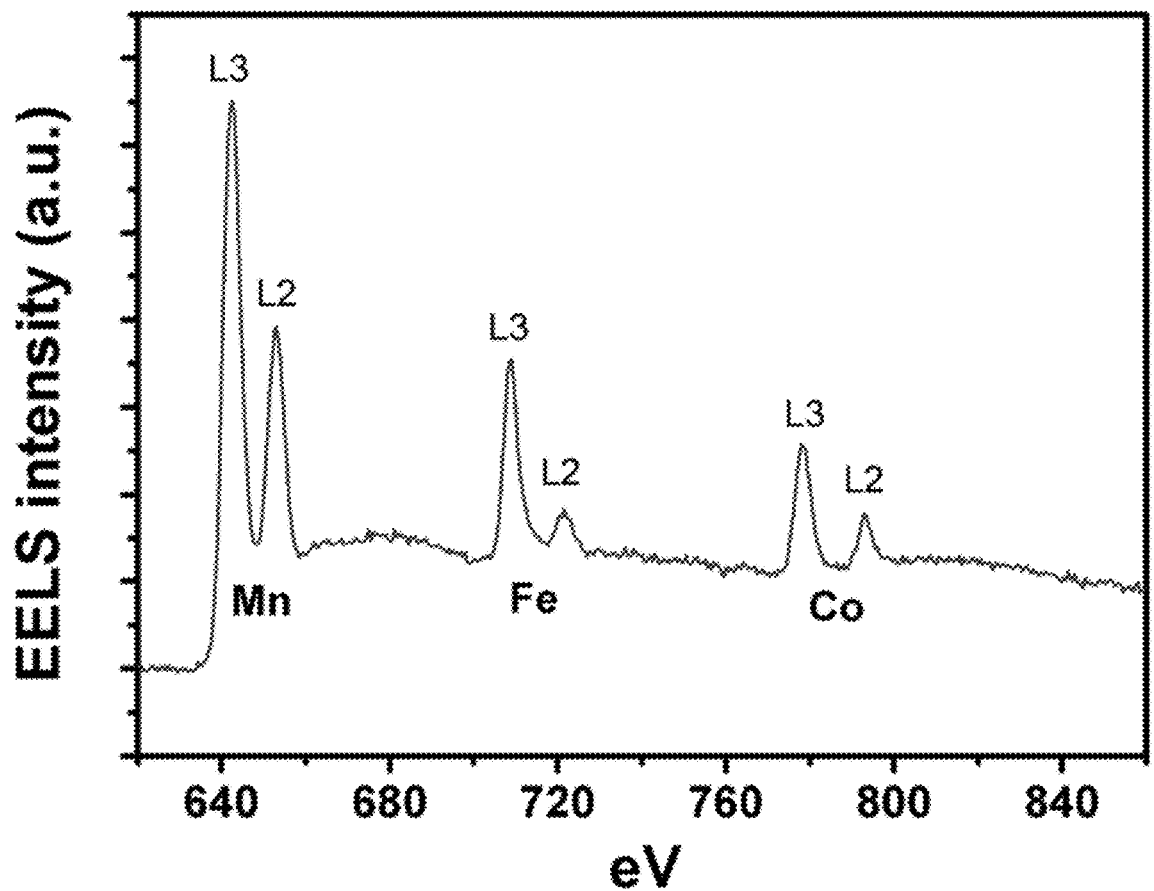
FIG. 11 illustrates an electron energy loss spectroscopy (EELS) spectrum for P2-MFC after the material was discharged in a battery to 1.5V, in another embodiment of the invention.

Electron energy loss spectroscopy (EELS) results for P2-MFC (FIG. 11 and FIG. 12) show that Co was reduced upon discharging to 1.5 V relative to the pristine P2-MFC where the Co valence state was designed to be 3+, while no reduction of Mn or Fe in the discharged sample was observed. EELS spectra were obtained from thin specimens on a JEOL 2010F Transmission Electron Microscope (TEM) equipped with Gatan spectrometer, using parallel incident electron beam and semi-collection angle of 8 mrad in TEM diffraction mode. FIG. 11 shows an EELS spectrum for P2-MFC after the material was discharged in a battery to 1.5V, wherein the L3/L2 peak intensity ratio is inversely proportional to the transition metal valence state. FIG. 12 shows the L3/L2 peak intensity ratios of Mn, Fe and Co as determined from EELS spectra for P2-MFC as in FIG. 11. Each mean and standard deviation value was obtained for n=5 measurements.

Figure 18:
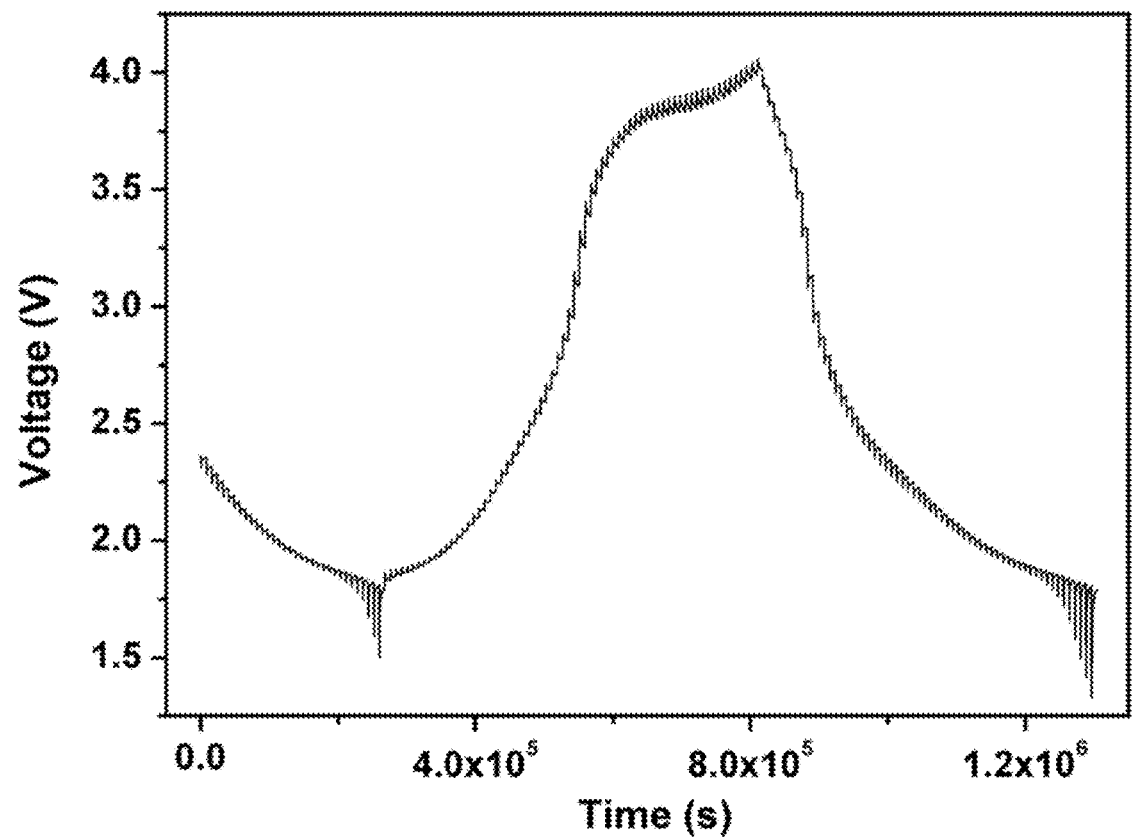
FIG. 18 illustrates a representative voltage vs. time curve resulting from galvanostatic intermittent titration technique (GITT) testing on a battery comprising P2-MFC, in yet another embodiment of the invention.

Thus reduction of $Co^{3+}$ to $Co^{2+}$ instead of the reduction of $Mn^{4+}$ to $Mn^{3+}$ in P2-MFC resulted in P2-MFC having the largest single phase region among all layered cathode materials for Na-ion batteries, as shown in Example 3. While similar electronic conductivities around $10^{-5}$ S/m were observed for several P2-type layered cathode materials as shown in FIG. 16, an enhanced $Na^+$ diffusion coefficient of order of magnitude $10^{-7}$ $cm^2\,s^{-1}$ due to the large single phase region was a significant advantage for the rate capability of P2-MFC relative to other P2-type layered materials. Values of the $Na^+$ diffusion coefficient in P2-MFC were calculated from several selected points on voltage vs. time curves resulting from galvanostatic intermittent titration technique (GITT) testing on batteries comprising P2-MFC as in Example 2 (FIG. 18). FIG. 18 shows a GITT curve for P2-MFC recorded with steps of 15 min charge at a current density of C/20 and 120 min relaxation. Electronic conductivity was measured on four pellets using the four probe method. One pellet was pressed from pristine P2-MC i.e. $P2-Na_{2/3}(Mn_{1/2}CO_{1/2})O_2$, a second from pristine P2-MF i.e. $P2-Na_{2/3}(Mn_{1/2}Fe_{1/2})O_2$, a third from pristine P2-MFC i.e. $P2-Na_{2/3}(Mn_{1/2}Fe_{1/4}Co_{1/4})O_2$, and a fourth from pristine P2-MCN i.e. $P2-Na_{0.67}(Mn_{0.65}Co_{0.2}Ni_{0.15})O_2$, and each pellet was calcined at 900° C. for two hours before the test.

Thus, this example illustrates that consistent with the design strategy for this material, in situ XRD and ex situ XRD revealed a very wide single P2-phase region in $Na_x(Mn_{1/2}Fe_{1/4}CO_{1/4})O_2$ (0.34<x<0.95) without any Na ordering, and EELS revealed that cobalt rather than manganese was reduced during discharge of a battery comprising P2-MFC, which prevented monoclinic distortion.

Example 5

This example illustrates high sodium ion diffusivity as one mechanism for the high rate performance of batteries comprising P2-MFC as seen in Example 2, as determined from the results of ab-initio molecular dynamics simulations.

Support for the high rate performance of P2-MFC can be found from first principles study. An ab-initio molecular dynamics modeling method was extended from use with $Na_xCoO_2$ to use with $Na_xMnO_2$ and $Na_xFeO_2$, and lower Na concentrations than previously studied were explored.

Ab-initio Molecular dynamics (AIMD) simulations were performed using density functional theory (DFT) implemented in the plane-wave-basis-set Vienna ab initio simulation package (VASP). Projector augmented wave potentials were employed in non-spin polarized AIMD calculations. Exchange and correlation functionals were described within the Perdew-Burke-Ernzerhof generalized gradient approximation.

Gamma-point only sampling of k-space and a plane-wave energy cutoff of 400 eV were used for all AIMD simulations. The P2 $Na_xMO_2$ (M=Mn, Co, Fe) supercell consisted of 4×4×1 conventional unit-cells and 32 formula units. To model compounds at different voltage with varying Na concentration, 12 and 22 Na atoms were kept in the supercell corresponding to 69% (x=0.69) and 37% (x=0.37) of Na concentration, respectively. The lattice parameters in the ab plane of fully sodiated phase were fully optimized by DFT and then fixed for AIMD simulations. The c lattice parameter of 5.5 Angstroms was used in the AIMD simulations, corresponding to the lower bound of the experimental values obtained from in situ XRD (about 5.5 Angstroms at 69% Na concentration and about 5.6 Angstroms at 37% Na concentration upon first discharge, see FIG. 3B).

The AIMD simulations were performed in the canonical ensemble and the time step was set to 2 femtoseconds. Temperatures were initialized at 100 K and scaled to appropriate temperatures (600 K, 720 K, 900 K, 1200 K and 1500 K) over 2 picoseconds, and the AIMD simulations was performed with from 40 picoseconds to 80 picoseconds for statistical analysis. The Na atomic trajectories were monitored during the simulation, and the diffusivities of Na ions were calculated for determination of the activation energy.

Figure 14:
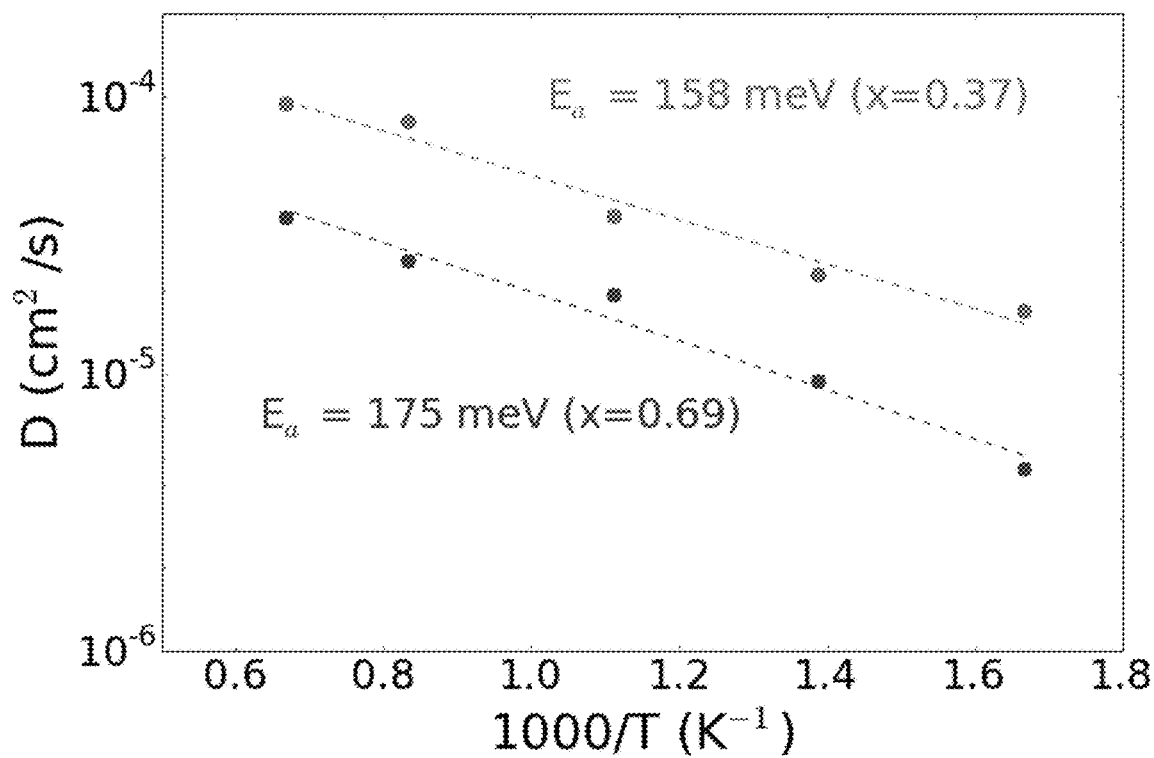
FIG. 14 illustrates Arrhenius plots of Na-ion diffusivities in P2-$NaMnO_2$ (x=0.37 and 0.69) calculated from the ab-initio molecular dynamics simulations, in another embodiment of the invention.

FIG. 14 shows Arrhenius plots of Na-ion diffusivities in P2-$Na_xMnO_2$ (x=0.37 and 0.69) calculated from the ab-initio molecular dynamics simulations. The estimated activation energy barrier at x=0.69 of 0.175 eV was smaller than previous reported, from 0.2 eV to 0.3 eV, due to a larger c-axis value used in this calculation.

FIG. 15 tabulates calculated Na-ion diffusivities (in $cm^2/s$) in P2-$Na_xMnO_2$, $Na_xFeO_2$ and $Na_xCoO_2$ (x=0.37 and x=0.69) at different temperatures. The experimentally determined values of the $Na^+$ diffusion coefficient from GITT testing as in Example 4 were consistent with the this extrapolation of Arrhenius plots of Na-ion diffusivities in P2-$Na_xMO_2$ (M=Mn, Fe, Co).

These calculations suggested that P2-type layered materials were fast Na conductors as Na ions migrated through a honeycomb sub-lattice with a low intrinsic energy barrier over a wide range of Na concentration (x=0.37 to x=0.69). Good diffusivity of Na ions (FIG. 15) occurred in these P2-type layered materials structure due to the large inter-slab distance (FIG. 3B) and low Na diffusion barrier (FIG. 14).

The results demonstrate that replacing Co with Mn or Fe did not significantly change the Na-ion diffusivity. It was even determined that there was a slightly lower activation energy at low Na concentration (0.16 eV at x=0.37) as compared to that at higher Na concentration (0.18 eV at x=0.69).

This example in combination with Example 1, Example 2, and Example 3 shows that both the wide single P2 phase region (Example 3) with low Na diffusion barrier (Example 5) and the lack of long-range ordering of Na ions (Example 1) in P2-MFC may have contributed to the excellent rate performance in batteries comprising P2-MFC (Example 2).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition, comprising:
a P2-type layered material having a chemical formula $Na_X(Mn_{1/2}Fe_{1/4}Co_{1/4})O_2$, wherein X has a value of greater than or equal to 0 and less than or equal to 1.

2. The composition of claim 1, wherein X has a value of greater than or equal to 0.30 and less than or equal to 1.

3. The composition of claim 1, wherein X has a value of greater than or equal to 0.34 and less than or equal to 0.95.

4. The composition of claim 1, wherein X has a value of greater than or equal to 0.56 and less than or equal to 0.75.

5. The composition of claim 1, wherein X is 0.95.

6. The composition of claim 1, wherein X is 0.14.

* * * * *

UNITED STATES PATENT AND TRADEMARK OFFICE
CERTIFICATE OF CORRECTION

PATENT NO. : 10,431,822 B2  
APPLICATION NO. : 15/582348  
DATED : October 1, 2019  
INVENTOR(S) : Gerbrand Ceder et al.

Page 1 of 1

It is certified that error appears in the above-identified patent and that said Letters Patent is hereby corrected as shown below:

On the Title Page

Item [57], Line 5 and 6:
"the chemical formula $Na_x(Mn_QFe_R\text{-}Co_T)O_2$"

Should read:
--the chemical formula $Na_x(Mn_QFe_RCo_T)O_2$--

Signed and Sealed this  
Twenty-fifth Day of February, 2020

Andrei Iancu  
*Director of the United States Patent and Trademark Office*